US011276079B2

(12) United States Patent
Sokolov et al.

(10) Patent No.: US 11,276,079 B2
(45) Date of Patent: Mar. 15, 2022

(54) METHOD AND SYSTEM FOR MEETING SERVICE LEVEL OF CONTENT ITEM PROMOTION

(71) Applicant: YANDEX EUROPE AG, Lucerne (CH)

(72) Inventors: Evgeny Andreevich Sokolov, Belaya Kalitva (RU); Andrey Petrovich Danilchenko, d Staraya (RU)

(73) Assignee: YANDEX EUROPE AG, Lucerne (CH)

( * ) Notice: Subject to any disclaimer, the term of this patent is extended or adjusted under 35 U.S.C. 154(b) by 11 days.

(21) Appl. No.: 16/934,288

(22) Filed: Jul. 21, 2020

(65) Prior Publication Data

US 2021/0073858 A1 Mar. 11, 2021

(30) Foreign Application Priority Data

Sep. 9, 2019 (RU) .......................... RU2019128258

(51) Int. Cl.
*G06Q 30/02* (2012.01)
*H04L 29/08* (2006.01)
(Continued)

(52) U.S. Cl.
CPC ....... *G06Q 30/0255* (2013.01); *G06F 3/0483* (2013.01); *G06F 3/04817* (2013.01);
(Continued)

(58) Field of Classification Search
CPC . G06Q 30/0255; G06Q 30/0251; H04L 67/22
See application file for complete search history.

(56) References Cited

U.S. PATENT DOCUMENTS

| 5,745,600 A | 4/1998 | Chen et al. |
| 7,007,242 B2 | 2/2006 | Suomela et al. |

(Continued)

FOREIGN PATENT DOCUMENTS

| CN | 103077220 A | 5/2013 |
| CN | 103167330 A | 6/2013 |

(Continued)

OTHER PUBLICATIONS

Office Action with regard to the U.S. Appl. No. 16/503,546 dated Oct. 4, 2021.

(Continued)

*Primary Examiner* — Nhat Huy T Nguyen
(74) *Attorney, Agent, or Firm* — BCF LLP

(57) ABSTRACT

A method and system for meeting a service level of content item promotion. The method is executable by a server hosting a recommendation service for providing digital content items to a user, the user being one of a plurality of users of the service. Storage communicatively coupled to the server contains data representative of the digital content items, and of the history of interactions of the plurality of users of the service with such digital content items. The method includes upon the server receiving a request for a promotion of a digital content item with a requested service level, calculating a threshold of probability within a distribution of users based on their likelihood that they take action over the digital content item, and providing the digital content item to users within the plurality of users of the service having a probability within the distribution that is above the threshold.

18 Claims, 9 Drawing Sheets

(51) Int. Cl.
*G06F 3/0483* (2013.01)
*G06N 20/00* (2019.01)
*H04L 67/50* (2022.01)
*G06Q 30/06* (2012.01)
*G06F 3/04817* (2022.01)

(52) U.S. Cl.
CPC ......... *G06N 20/00* (2019.01); *G06Q 30/0631* (2013.01); *H04L 67/22* (2013.01)

(56) References Cited

U.S. PATENT DOCUMENTS

| | | |
|---|---|---|
| 7,328,216 B2 | 2/2008 | Hofmann et al. |
| 7,451,173 B1 | 11/2008 | Van et al. |
| 7,502,789 B2 | 3/2009 | Yao et al. |
| 7,540,051 B2 | 6/2009 | Gundersen et al. |
| D607,463 S | 1/2010 | Krieter et al. |
| 7,685,200 B2 | 3/2010 | Gunawardena et al. |
| 7,685,232 B2 | 3/2010 | Gibbs et al. |
| D613,300 S | 4/2010 | Chaudhri |
| 7,849,076 B2 | 12/2010 | Zheng et al. |
| 8,010,527 B2 | 8/2011 | Denoue et al. |
| 8,225,195 B1 | 7/2012 | Bryar et al. |
| 8,244,740 B2 | 8/2012 | Gruenhagen et al. |
| 8,271,898 B1 | 9/2012 | Mattos et al. |
| 8,285,602 B1 | 10/2012 | Yi et al. |
| 8,290,818 B1 | 10/2012 | Levitan et al. |
| 8,296,179 B1 | 10/2012 | Rennison |
| 8,301,623 B2 | 10/2012 | Chakrabarti et al. |
| 8,386,955 B1 | 2/2013 | Weber et al. |
| 8,412,726 B2 | 4/2013 | Yan et al. |
| 8,429,184 B2 | 4/2013 | Ismalon |
| D682,844 S | 5/2013 | Friedlander et al. |
| 8,478,664 B1 | 7/2013 | Xavier et al. |
| 8,478,750 B2 | 7/2013 | Rao et al. |
| 8,510,252 B1 | 8/2013 | Gargi et al. |
| D691,619 S | 10/2013 | Satterfield et al. |
| 8,554,601 B1 | 10/2013 | Marsh et al. |
| D693,833 S | 11/2013 | Inose et al. |
| 8,583,418 B2 | 11/2013 | Silverman et al. |
| 8,600,968 B2 | 12/2013 | Holenstein et al. |
| 8,606,792 B1 | 12/2013 | Jackson et al. |
| 8,655,829 B2 | 2/2014 | Flinn et al. |
| 8,676,736 B2 | 3/2014 | Pilaszy et al. |
| 8,683,374 B2 | 3/2014 | Vaughan et al. |
| 8,712,937 B1 | 4/2014 | Bacus et al. |
| 8,751,507 B2 | 6/2014 | Kim et al. |
| 8,869,042 B2 | 10/2014 | Kast |
| 8,886,797 B2 | 11/2014 | Gannu et al. |
| 8,893,042 B2 | 11/2014 | Laurie et al. |
| 8,893,043 B2 | 11/2014 | Dodson et al. |
| 8,903,834 B2 | 12/2014 | Ciancutti et al. |
| 8,910,070 B2 | 12/2014 | Goodger et al. |
| 8,914,399 B1 | 12/2014 | Paleja et al. |
| 8,935,258 B2 | 1/2015 | Svore et al. |
| 8,972,391 B1 | 3/2015 | McDonnell et al. |
| 8,972,865 B2 | 3/2015 | Hansen et al. |
| 8,983,888 B2 | 3/2015 | Nice et al. |
| 8,996,530 B2 | 3/2015 | Luvogt et al. |
| 9,053,416 B1 | 6/2015 | De Leo et al. |
| D733,747 S | 7/2015 | Jeong et al. |
| 9,098,248 B2 | 8/2015 | Suzuki et al. |
| 9,098,551 B1 | 8/2015 | Fryz et al. |
| 9,122,989 B1 | 9/2015 | Morris et al. |
| D751,570 S | 3/2016 | Lee et al. |
| D751,571 S | 3/2016 | Lee et al. |
| D751,572 S | 3/2016 | Lee et al. |
| D752,601 S | 3/2016 | Lam |
| D752,636 S | 3/2016 | Yoon et al. |
| 9,317,498 B2 | 4/2016 | Baker et al. |
| D755,805 S | 5/2016 | Zankowski et al. |
| D755,806 S | 5/2016 | Zankowski et al. |
| D755,832 S | 5/2016 | Liu et al. |
| D757,788 S | 5/2016 | Shrivastava |
| 9,348,898 B2 | 5/2016 | Nice et al. |
| 9,396,258 B2 | 7/2016 | Chu et al. |
| 9,405,741 B1 | 8/2016 | Schaaf et al. |
| D766,274 S | 9/2016 | Che et al. |
| 9,471,671 B1 | 10/2016 | Juang et al. |
| 9,473,803 B2 | 10/2016 | Wang |
| 9,569,785 B2 | 2/2017 | Alon et al. |
| 9,582,767 B2 | 2/2017 | Somekh et al. |
| 9,660,947 B1 | 5/2017 | Hart |
| 9,703,783 B2 | 7/2017 | Yi et al. |
| 9,785,883 B2 | 10/2017 | Luvogt et al. |
| 9,836,533 B1 | 12/2017 | Levi et al. |
| 9,836,765 B2 | 12/2017 | Hariri et al. |
| 9,846,836 B2 | 12/2017 | Gao et al. |
| D806,723 S | 1/2018 | Gussev et al. |
| 9,900,659 B1 | 2/2018 | Norum et al. |
| 9,916,613 B1 | 3/2018 | Dorner et al. |
| 10,003,924 B2 | 6/2018 | Volozh et al. |
| 10,051,304 B2 | 8/2018 | Tidwell et al. |
| D828,369 S | 9/2018 | Arutyunyan et al. |
| 10,102,559 B1 | 10/2018 | Jain et al. |
| 10,114,901 B2 | 10/2018 | Mitrovic |
| 10,149,958 B1 | 12/2018 | Tran et al. |
| 10,242,259 B2 | 3/2019 | Hagelin |
| D847,163 S | 4/2019 | Matsumura |
| 10,909,576 B1 | 2/2021 | Arivukkarasu et al. |
| 11,074,495 B2 | 7/2021 | Zadeh et al. |
| 2002/0054164 A1 | 5/2002 | Uemura |
| 2002/0198882 A1 | 12/2002 | Linden et al. |
| 2004/0158497 A1 | 8/2004 | Brand |
| 2004/0260621 A1 | 12/2004 | Foster et al. |
| 2005/0076365 A1 | 4/2005 | Popov et al. |
| 2005/0086110 A1 | 4/2005 | Haley et al. |
| 2005/0097190 A1 | 5/2005 | Abdelhak |
| 2006/0031114 A1 | 2/2006 | Zommers |
| 2006/0041548 A1 | 2/2006 | Parsons et al. |
| 2006/0293065 A1 | 12/2006 | Chew et al. |
| 2008/0134043 A1 | 6/2008 | Georgis et al. |
| 2008/0222132 A1 | 9/2008 | Pan et al. |
| 2008/0243733 A1 | 10/2008 | Black |
| 2008/0250039 A1 | 10/2008 | Franks et al. |
| 2008/0256017 A1 | 10/2008 | Murakami |
| 2008/0266289 A1 | 10/2008 | Park |
| 2008/0281711 A1 | 11/2008 | Bridges et al. |
| 2008/0294617 A1 | 11/2008 | Chakrabarti et al. |
| 2009/0006371 A1 | 1/2009 | Denoue |
| 2009/0006373 A1 | 1/2009 | Chakrabarti et al. |
| 2009/0006398 A1 | 1/2009 | Lam et al. |
| 2009/0055385 A1 | 2/2009 | Jeon et al. |
| 2009/0150935 A1 | 6/2009 | Peters et al. |
| 2009/0163183 A1 | 6/2009 | O'Donoghue et al. |
| 2009/0199113 A1 | 8/2009 | McWhinnie et al. |
| 2009/0249217 A1 | 10/2009 | Narayanaswami |
| 2009/0276368 A1 | 11/2009 | Martin et al. |
| 2009/0327941 A1 | 12/2009 | Fong et al. |
| 2010/0050067 A1 | 2/2010 | Curwen et al. |
| 2010/0070454 A1 | 3/2010 | Masuda et al. |
| 2010/0070928 A1 | 3/2010 | Goodger et al. |
| 2010/0082422 A1* | 4/2010 | Heilig ................ G06Q 30/02 705/14.41 |
| 2010/0131844 A1 | 5/2010 | Wohlert |
| 2010/0175018 A1 | 7/2010 | Petschnigg et al. |
| 2010/0205542 A1 | 8/2010 | Walman |
| 2010/0241597 A1 | 9/2010 | Chen et al. |
| 2010/0251304 A1 | 9/2010 | Donoghue et al. |
| 2010/0312650 A1 | 12/2010 | Pinckney et al. |
| 2010/0312724 A1 | 12/2010 | Pinckney et al. |
| 2011/0029636 A1 | 2/2011 | Smyth et al. |
| 2011/0035388 A1 | 2/2011 | Im et al. |
| 2011/0047136 A1 | 2/2011 | Dehn |
| 2011/0047491 A1 | 2/2011 | Hwang et al. |
| 2011/0066497 A1 | 3/2011 | Gopinath et al. |
| 2011/0072011 A1 | 3/2011 | Qiao |
| 2011/0072013 A1 | 3/2011 | Mosoi et al. |
| 2011/0107223 A1 | 5/2011 | Tilton et al. |
| 2011/0112981 A1 | 5/2011 | Park et al. |
| 2011/0125763 A1 | 5/2011 | Takanen et al. |
| 2011/0179081 A1 | 7/2011 | Ovsjanikov et al. |
| 2011/0208732 A1 | 8/2011 | Melton et al. |
| 2011/0213761 A1 | 9/2011 | Song et al. |

(56) References Cited

U.S. PATENT DOCUMENTS

| | | |
|---|---|---|
| 2011/0246406 A1 | 10/2011 | Lahav et al. |
| 2011/0252050 A1 | 10/2011 | Palleti et al. |
| 2011/0258185 A1 | 10/2011 | Acharya et al. |
| 2011/0302117 A1 | 12/2011 | Pinckney et al. |
| 2011/0302158 A1 | 12/2011 | Sanders |
| 2011/0320450 A1 | 12/2011 | Liu et al. |
| 2012/0030159 A1 | 2/2012 | Pilaszy et al. |
| 2012/0054794 A1 | 3/2012 | Kim et al. |
| 2012/0059707 A1 | 3/2012 | Goenka et al. |
| 2012/0143871 A1 | 6/2012 | Liebald et al. |
| 2012/0158685 A1 | 6/2012 | White et al. |
| 2012/0159337 A1 | 6/2012 | Travilla et al. |
| 2012/0191776 A1 | 7/2012 | Ruffner et al. |
| 2012/0209907 A1 | 8/2012 | Andrews et al. |
| 2012/0254097 A1 | 10/2012 | Flinn et al. |
| 2012/0278767 A1 | 11/2012 | Stibel et al. |
| 2012/0288153 A1 | 11/2012 | Tojo et al. |
| 2012/0304073 A1 | 11/2012 | Mandic et al. |
| 2012/0317104 A1 | 12/2012 | Radlinski et al. |
| 2012/0323349 A9 | 12/2012 | Khedouri et al. |
| 2013/0009990 A1 | 1/2013 | Hsu et al. |
| 2013/0024471 A1 | 1/2013 | Mitrovic |
| 2013/0031090 A1 | 1/2013 | Posse et al. |
| 2013/0041896 A1 | 2/2013 | Ghani et al. |
| 2013/0046772 A1 | 2/2013 | Gu et al. |
| 2013/0047112 A1 | 2/2013 | Waeller |
| 2013/0073988 A1 | 3/2013 | Groten et al. |
| 2013/0080968 A1 | 3/2013 | Hanson et al. |
| 2013/0085871 A1 | 4/2013 | Goss et al. |
| 2013/0111395 A1 | 5/2013 | Ying et al. |
| 2013/0132515 A1 | 5/2013 | Mostafa et al. |
| 2013/0158693 A1 | 6/2013 | Beckmann et al. |
| 2013/0159243 A1 | 6/2013 | Wei et al. |
| 2013/0179252 A1 | 7/2013 | Dong et al. |
| 2013/0194308 A1 | 8/2013 | Privault et al. |
| 2013/0204737 A1 | 8/2013 | Agarwal et al. |
| 2013/0227054 A1 | 8/2013 | Zhang et al. |
| 2013/0241952 A1 | 9/2013 | Richman et al. |
| 2013/0262478 A1 | 10/2013 | Kemp et al. |
| 2013/0290110 A1 | 10/2013 | Luvogt et al. |
| 2013/0290905 A1 | 10/2013 | Luvogt et al. |
| 2013/0297698 A1 | 11/2013 | Odero et al. |
| 2013/0311408 A1 | 11/2013 | Bagga et al. |
| 2013/0346182 A1 | 12/2013 | Cheng et al. |
| 2013/0346234 A1 | 12/2013 | Hendrick et al. |
| 2013/0346545 A1 | 12/2013 | Petersen et al. |
| 2014/0006399 A1 | 1/2014 | Vasudevan et al. |
| 2014/0025532 A1 | 1/2014 | Huang et al. |
| 2014/0025609 A1 | 1/2014 | Coster et al. |
| 2014/0032678 A1 | 1/2014 | Koukoumidis et al. |
| 2014/0040776 A1 | 2/2014 | Dann et al. |
| 2014/0074856 A1 | 3/2014 | Rao et al. |
| 2014/0095967 A1 | 4/2014 | Cheng et al. |
| 2014/0100835 A1 | 4/2014 | Majumdar et al. |
| 2014/0101142 A1 | 4/2014 | Gomez et al. |
| 2014/0101192 A1 | 4/2014 | Sabah et al. |
| 2014/0122605 A1 | 5/2014 | Merom et al. |
| 2014/0129500 A1 | 5/2014 | Nice et al. |
| 2014/0136528 A1 | 5/2014 | Anima et al. |
| 2014/0137013 A1 | 5/2014 | Matas |
| 2014/0143012 A1 | 5/2014 | Alon et al. |
| 2014/0143738 A1 | 5/2014 | Underwood et al. |
| 2014/0156681 A1 | 6/2014 | Lee et al. |
| 2014/0164365 A1 | 6/2014 | Graham |
| 2014/0172544 A1 | 6/2014 | Rabkin |
| 2014/0172545 A1 | 6/2014 | Rabkin |
| 2014/0181121 A1 | 6/2014 | Nice et al. |
| 2014/0189014 A1 | 7/2014 | Dolan et al. |
| 2014/0195890 A1 | 7/2014 | Taylor et al. |
| 2014/0201675 A1 | 7/2014 | Joo et al. |
| 2014/0207622 A1 | 7/2014 | Vijayaraghavan et al. |
| 2014/0250390 A1 | 9/2014 | Holmes et al. |
| 2014/0278308 A1 | 9/2014 | Liu et al. |
| 2014/0278786 A1 | 9/2014 | Liu-Qiu-Yan |
| 2014/0280080 A1 | 9/2014 | Solheim et al. |
| 2014/0280221 A1 | 9/2014 | Chuang et al. |
| 2014/0280565 A1 | 9/2014 | Grewal |
| 2014/0298263 A1 | 10/2014 | Maeda et al. |
| 2014/0316930 A1 | 10/2014 | Jain et al. |
| 2014/0317105 A1 | 10/2014 | Jain et al. |
| 2014/0358916 A1 | 12/2014 | Anand et al. |
| 2014/0359489 A1 | 12/2014 | Zhao et al. |
| 2014/0365853 A1 | 12/2014 | Kleinhout et al. |
| 2014/0365854 A1 | 12/2014 | Karunamuni et al. |
| 2014/0379893 A1 | 12/2014 | Kannan et al. |
| 2014/0380219 A1 | 12/2014 | Cartan |
| 2015/0006286 A1 | 1/2015 | Liu et al. |
| 2015/0039406 A1 | 2/2015 | Dubey et al. |
| 2015/0052003 A1 | 2/2015 | Tang et al. |
| 2015/0058264 A1 | 2/2015 | Hughes et al. |
| 2015/0066643 A1 | 3/2015 | Choi et al. |
| 2015/0088921 A1 | 3/2015 | Somaiya et al. |
| 2015/0100587 A1 | 4/2015 | Walkingshaw et al. |
| 2015/0112801 A1 | 4/2015 | Nice et al. |
| 2015/0120712 A1 | 4/2015 | Yi et al. |
| 2015/0120722 A1 | 4/2015 | Martin et al. |
| 2015/0154197 A1 | 6/2015 | Lightner et al. |
| 2015/0161256 A1 | 6/2015 | Jeh |
| 2015/0161672 A1 | 6/2015 | Jung et al. |
| 2015/0169557 A1 | 6/2015 | Ciordas et al. |
| 2015/0178282 A1 | 6/2015 | Gorur et al. |
| 2015/0189070 A1 | 7/2015 | Baker |
| 2015/0220835 A1 | 8/2015 | Wilson et al. |
| 2015/0242492 A1 | 8/2015 | Bhatt et al. |
| 2015/0269370 A1 | 9/2015 | Phillips |
| 2015/0269488 A1 | 9/2015 | Galai et al. |
| 2015/0278706 A1 | 10/2015 | Shivashankar et al. |
| 2015/0312348 A1 | 10/2015 | Lustgarten |
| 2015/0325094 A1 | 11/2015 | Cheng et al. |
| 2015/0330805 A1 | 11/2015 | Cho et al. |
| 2015/0331859 A1 | 11/2015 | Raichelgauz et al. |
| 2015/0331951 A1 | 11/2015 | Wang et al. |
| 2015/0347358 A1 | 12/2015 | Shultz et al. |
| 2015/0347920 A1 | 12/2015 | Medlock et al. |
| 2015/0370798 A1 | 12/2015 | Ju et al. |
| 2015/0378707 A1 | 12/2015 | Park et al. |
| 2015/0379146 A1 | 12/2015 | Tonse et al. |
| 2016/0004394 A1 | 1/2016 | Macadaan et al. |
| 2016/0019581 A1* | 1/2016 | Wu .................. G06Q 30/0269 705/14.43 |
| 2016/0021179 A1 | 1/2016 | James et al. |
| 2016/0055242 A1 | 2/2016 | Bradic et al. |
| 2016/0063065 A1 | 3/2016 | Khatri et al. |
| 2016/0070803 A1 | 3/2016 | Nuckolls |
| 2016/0110363 A1 | 4/2016 | Tkach et al. |
| 2016/0112760 A1 | 4/2016 | Kosseifi et al. |
| 2016/0117397 A1 | 4/2016 | Bansal et al. |
| 2016/0147753 A1 | 5/2016 | Dimson et al. |
| 2016/0154887 A1 | 6/2016 | Zhao |
| 2016/0170982 A1 | 6/2016 | Djuric et al. |
| 2016/0188739 A1 | 6/2016 | Tang et al. |
| 2016/0196244 A1 | 7/2016 | Greenberg et al. |
| 2016/0210289 A1 | 7/2016 | Esinovskaya et al. |
| 2016/0239871 A1 | 8/2016 | Yu et al. |
| 2016/0259790 A1 | 9/2016 | Mashiach et al. |
| 2016/0274744 A1 | 9/2016 | Neumann et al. |
| 2016/0275804 A1 | 9/2016 | Koppel et al. |
| 2016/0283481 A1 | 9/2016 | Morley et al. |
| 2016/0299992 A1 | 10/2016 | Cetintas et al. |
| 2016/0328480 A1 | 11/2016 | Owens et al. |
| 2016/0350812 A1 | 12/2016 | Priness et al. |
| 2016/0371274 A1 | 12/2016 | Ng et al. |
| 2017/0011112 A1 | 1/2017 | Jing et al. |
| 2017/0011409 A1 | 1/2017 | Eager et al. |
| 2017/0017369 A1 | 1/2017 | Kanter et al. |
| 2017/0024391 A1 | 1/2017 | Steck |
| 2017/0024657 A1 | 1/2017 | Sahu et al. |
| 2017/0053646 A1 | 2/2017 | Watanabe et al. |
| 2017/0060870 A1 | 3/2017 | Checkley |
| 2017/0060872 A1 | 3/2017 | Sacheti et al. |
| 2017/0061014 A1 | 3/2017 | Heiler et al. |
| 2017/0061286 A1 | 3/2017 | Kumar et al. |
| 2017/0068992 A1 | 3/2017 | Chen et al. |
| 2017/0076318 A1 | 3/2017 | Goswami et al. |

(56) References Cited

U.S. PATENT DOCUMENTS

| | | |
|---|---|---|
| 2017/0083965 A1 | 3/2017 | Sun |
| 2017/0091194 A1 | 3/2017 | Spiegel |
| 2017/0103343 A1 | 4/2017 | Yee et al. |
| 2017/0124093 A1 | 5/2017 | Carbonell et al. |
| 2017/0132230 A1 | 5/2017 | Muralidhar et al. |
| 2017/0161773 A1 | 6/2017 | Xu et al. |
| 2017/0293865 A1 | 10/2017 | Sandler |
| 2017/0337612 A1 | 11/2017 | Galron et al. |
| 2018/0011937 A1 | 1/2018 | Tikhonov |
| 2018/0012236 A1 | 1/2018 | Zhuo et al. |
| 2018/0014038 A1 | 1/2018 | Lamburt et al. |
| 2018/0020258 A1 | 1/2018 | Jeon et al. |
| 2018/0049001 A1 | 2/2018 | Volozh et al. |
| 2018/0075137 A1 | 3/2018 | Lifar |
| 2018/0096388 A1 | 4/2018 | Lu |
| 2018/0204111 A1 | 7/2018 | Zadeh et al. |
| 2018/0336183 A1 | 11/2018 | Lee et al. |
| 2018/0365562 A1 | 12/2018 | Volkova |
| 2019/0034432 A1 | 1/2019 | Rybalchenko et al. |
| 2019/0060602 A1 | 2/2019 | Tran et al. |
| 2019/0069030 A1 | 2/2019 | Jackman et al. |
| 2019/0130296 A1 | 5/2019 | Basu et al. |
| 2019/0236448 A1 | 8/2019 | Piatt |
| 2019/0342616 A1 | 11/2019 | Domm et al. |
| 2020/0007936 A1 | 1/2020 | Salomatin et al. |
| 2020/0090247 A1 | 3/2020 | Sokolov et al. |
| 2020/0184278 A1 | 6/2020 | Zadeh et al. |
| 2020/0202073 A1 | 6/2020 | Ghulati |

FOREIGN PATENT DOCUMENTS

| | | |
|---|---|---|
| CN | 103473354 A | 12/2013 |
| CN | 103559262 A | 2/2014 |
| CN | 103678672 A | 3/2014 |
| CN | 103838842 A | 6/2014 |
| CN | 103942288 A | 7/2014 |
| CN | 104102696 A | 10/2014 |
| CN | 104317835 A | 1/2015 |
| CN | 104503973 A | 4/2015 |
| CN | 104636371 A | 5/2015 |
| CN | 303532062 S | 12/2015 |
| CN | 105893398 A | 8/2016 |
| CN | 103559262 B | 10/2016 |
| CN | 106446195 A | 2/2017 |
| CN | 106777229 A | 5/2017 |
| CN | 106802915 A | 6/2017 |
| CN | 106815297 A | 6/2017 |
| CN | 106874374 A | 6/2017 |
| CN | 107491813 A | 12/2017 |
| CN | 107577682 A | 1/2018 |
| CN | 104903889 B | 5/2018 |
| CN | 108346072 A | 7/2018 |
| EP | 3032780 A | 6/2016 |
| JP | 2009015834 A | 1/2009 |
| JP | 2015079395 A | 4/2015 |
| KR | 20160064447 A | 6/2016 |
| RU | 2368006 C1 | 9/2009 |
| RU | 2417419 C2 | 4/2011 |
| RU | 2417437 C2 | 4/2011 |
| RU | 2419858 C2 | 5/2011 |
| RU | 2451986 C2 | 11/2011 |
| RU | 2481748 C2 | 5/2013 |
| RU | 2509341 C2 | 3/2014 |
| RU | 2523930 C2 | 7/2014 |
| RU | 2013101601 A | 7/2014 |
| RU | 2543315 C2 | 2/2015 |
| RU | 2577193 C2 | 3/2016 |
| RU | 2580516 C2 | 4/2016 |
| RU | 2605039 C2 | 12/2016 |
| RU | 2629449 C2 | 8/2017 |
| RU | 2632100 C2 | 10/2017 |
| RU | 2632132 C1 | 10/2017 |
| RU | 2632138 C2 | 10/2017 |
| RU | 2660602 C1 | 7/2018 |
| RU | 2017101241 A | 7/2018 |
| RU | 2663478 C2 | 8/2018 |
| WO | 2002052374 A2 | 7/2002 |
| WO | 2009087414 A1 | 7/2009 |
| WO | 2013010698 A1 | 1/2013 |
| WO | 2013189738 A1 | 12/2013 |
| WO | 2014141078 A1 | 9/2014 |
| WO | 2016030702 A1 | 3/2016 |
| WO | 2019043381 A1 | 3/2019 |

OTHER PUBLICATIONS

Office Action with regard to the counterpart U.S. Appl. No. 16/010,152 dated Apr. 2, 2021.

Office Action with regard to the counterpart U.S. Appl. No. 16/009,929 dated Mar. 16, 2021.

Office Action with regard to the counterpart U.S. Appl. No. 15/607,555 dated Aug. 17, 2021.

Office Action with regard to the counterpart U.S. Appl. No. 16/372,553 dated Jul. 29, 2021.

Office Action with regard to the counterpart U.S. Appl. No. 16/009,929 dated Aug. 2, 2021.

Menczer, "Fake Online News Spreads Through Social Echo Chambers", The Conversation, Computing, ScientificAmerican.com, Nov. 28, 2016, pp. 1-10.

Office Action with regard to the counterpart U.S. Appl. No. 15/607,555 dated Jun. 11, 2021.

Notice of Allowance with regard to the U.S. Appl. No. 16/503,560 dated Jun. 8, 2021.

Levy et al., "Neural Ward Embedding as Implicit Matrix Factorization", Advances in Neural Information Processing, 2014, p. 2177- 2185 (Year: 2014)—cited in the Office Action with regard to the counterpart U.S. Appl. No. 15/607,555 dated Jun. 11, 2021.

English Abstract for CN104317835 retrieved on Espacenet on May 7, 2018.

English Abstract for CN105893398 retrieved on Espacenet on May 7, 2018.

English Abstract for CN106446195 retrieved on Espacenet on May 7, 2018.

English Abstract for KR20160064447 retrieved on Espacenet on May 7, 2018.

English Abstract for CN104102696 retrieved on Espacenet on May 8, 2018.

English Abstract for JP2015079395 retrieved on Espacenet on May 8, 2018.

English Abstract for CN106777229 retrieved on Espacenet on May 8, 2018.

English Abstract for CN103942288 retrieved on Espacenet on May 8, 2018.

English Abstract for CN103559262 retrieved on Espacenet on May 8, 2018.

English Abstract for CN106815297 retrieved on Espacenet on May 8, 2018.

English Abstract for CN106802915 retrieved on Espacenet on May 8, 2018.

English Abstract for CN107491813 retrieved on Espacenet on May 8, 2018.

English Abstract for CN104503973 retrieved on Espacenet on May 8, 2018.

English Abstract for CN106874374 retrieved on Espacenet on May 8, 2018.

English Abstract for CN104636371 retrieved on Espacenet on May 8, 2018.

Beemanapalli et al., "Incorporating Usage Information into Average-Clicks Algorithm", Lecture Notes in Computer Science, vol. 4811, 2007, pp. 21-35, https://link.springer.com/chapter/10.1007%2F978-3-540-77485-3_2.

English Abstract for CN103167330 retrieved on Espacenet on May 9, 2018.

English Abstract for CN103473354 retrieved on Espacenet on Jan. 4, 2019.

English Abstract for JP2009015834 retrieved on Espacenet on Mar. 21, 2019.

(56) References Cited

OTHER PUBLICATIONS

Notice of Allowance with regard to the counterpart U.S. Appl. No. 15/262,332 dated Mar. 18, 2019.
Office Action with regard to the counterpart U.S. Appl. No. 15/592,745 dated Mar. 8, 2019.
Office Action with regard to the counterpart U.S. Appl. No. 15/262,318 dated Apr. 1, 2019.
Search Report with regard to the counterpart U.S. Patent Application No. 2017140972 completed May 13, 2019.
Office Action with regard to the counterpart U.S. Appl. No. 15/263,493 dated May 9, 2019.
Martin Beck, "Facebook Now Asks Why You're Hiding That Ad, To Better Target Them & Block Offensive Ones" (Sep. 11, 2014), Marketing Land, Social Media Marketing, Retrieved May 4, 2019, PDF Attached, https://marketingland.com/facebook-adjusts-news-feed-mix-suppress-ads-users-hide-99727 (Year: 2014).
Notice of Allowance received with regard to the counterpart U.S. Appl. No. 15/606,658 dated Jun. 26, 2019.
Notice of Allowance received with regard to the counterpart U.S. Appl. No. 29/590,781 dated Dec. 20, 2019.
Search Report with regard to the counterpat RU Patent Application No. 2018132716 completed Nov. 25, 2019.
"Browser Amigo by Mail.ru", https://www.youtube.com/watch?v=9IPOwppIcWM accessed on Mar. 9, 2020; https://www.youtube.com/watch?v=vdxnXZT2tQo accessed on Mar. 9, 2020, pdf 7 pages.
Search Report with regard to the counterpart RU Patent Application No. 2018132708 completed Feb. 18, 2020.
Search Report with regard to the counterpart RU Patent Application No. 2018132713 completed Feb. 21, 2020.
English Abstract for RU2017101241 retrieved on Espacenet on Mar. 12, 2020.
English Abstract for CN107577682 retrieved on Espacenet on Mar. 12, 2020.
English Abstract for CN108346072 retrieved on Espacenet on Mar. 12, 2020.
Notice of Allowance with regard to the counterpart U.S. Appl. No. 16/370,286 dated Mar. 31, 2020.
Office Action with regard to the counterpart U.S. Appl. No. 16/010,152 dated Apr. 7, 2020.
Search Report with regard to the counterpart RU Patent Application No. 2018135362 completed Mar. 26, 2020.
English Abstract for CN104903889 retrieved on Espacenet on Apr. 16, 2020.
Search Report with regard to the counterpart RU Patent Application No. 2018135455 completed May 22, 2020.
U.S. Appl. No. 16/503,560, filed Jul. 4, 2019.
Design U.S. Appl. No. 29/724,347, filed Feb. 14, 2020.
Design U.S. Appl. No. 29/731,923, filed Apr. 20, 2020.
Design U.S. Appl. No. 29/731,925, filed Apr. 20, 2020.
English Abstract for CN103559262 retrieved on Espacenet on Jan. 8, 2020.
Office Action with regard to the counterpart U.S. Appl. No. 16/503,560 dated Apr. 15, 2021.
Office Action with regard to the counterpart U.S. Appl. No. 15/607,555 dated Apr. 19, 2021.
Xiao et al., "Research and Implementation of Hybrid Recommandation Algorithm Based on Collaborative Filtering and Word2Vec", 2015 8th International Symposium on Computational Intelligence and Design, 2015 (Year: 2015).
Koren et al., "Matrix Factorization Techniques for Recommander Systems", IEEE Computer, vol. 42, Issue 8, Aug. 2009 (Year: 2009).
Office Action with regard to the U.S. Appl. No. 16/371,624 dated Jul. 7, 2021.
English abstract of CN 103838842 retrieved from Espacenet on Feb. 3, 2017.
Brunner, Don't panic: Mozilla will be incorporating ads into Firefox, http://www.extremetech.com/internet/176521-dont-panic-mozilla-will-be-incorporating-ads-into-firefox, Feb. 12, 2014, retrieved on Nov. 11, 2016.
Mozilla / newnewtab, https://github.com/mozilla/newnewtab, retrieved on Nov. 11, 2016, 2 pages.
Brinkmann, Mozilla adds Suggested Sites feature to New Tab Page, May 15, 2015, http://www.ghacks.net/2015/05/15/mozilla-adds-suggested-sites-feature-to-new-tab-page/, retrieved on Nov. 11, 2016, 14 pages.
Lee, Mozilla Labs, New Tab Site Suggestions, https://blog.mozilla.org/labs/2012/11/new-tab-site-suggestions/, Nov. 2, 2012, retrieved on Nov. 11, 2016, 5 pages.
Opera Help, Speed Dial, http://help.opera.com/Windows/12.10/en/speeddial.html, retrieved on Nov. 11, 2016, 2 pages.
Sams, Windows 10 build 10120: Microsoft introduces a 'new tab' page for Edge, https://www.neowin.net/news/windows-10-build-10120-microsoft-introduces-a-039new-tab039-page-for-edge, May 18, 2015, retrieved on Nov. 11, 2016, 4 pages.
Russian Search Report from RU patent application No. 2015141291 dated Nov. 2, 2016.
Extended European Search Report from EP16190997, dated Feb. 16, 2017, Herry, Tzvetanka.
European Search report from EP 16185747, Siodmok, Wojciech, dated Jan. 18, 2017.
English abstract of CN103678672 retrieved from Espacenet on Jan. 20, 2017.
English abstract of CN103077220 retrieved from Espacenet on Jan. 20, 2017.
Russian Search Report dated Nov. 9, 2016 from Russian Patent Application No. 2015136684.
Amatriain et al., System Architectures for Personalization and Recommendation, http://techblog.netflix.com/2013/03/system-architectures-for.html, retrieved on May 30, 2015.
English Abstract of CN303532062 retrieved on Google Translate on Apr. 4, 2017.
Kumar et al., "Knowledge Retrieval from Web Server Logs Using Web Usage Mining", International Journal of Science and Research (IJSR), 2015, vol. 4, Issue 3, pp. 2173-2176.
Kim et al., "Ranking Web Documents with Dynamic Evaluation by Expert Groups", J. Eder and M. Missikoff (Eds.), CAISE, 2003, pp. 437-448.
Russian Search Report from RU patent application No. 2016127447 dated Feb. 7, 2017.
Pilaszy et al., "Fast ALS-based Matrix Factorization for Explicit and Implicit Feedback Datasets", RECSYS'10, 2010, pp. 71-78.
U.S. Appl. No. 15/236,538, filed Aug. 15, 2016.
U.S. Appl. No. 15/263,493, filed Sep. 13, 2016.
U.S. Appl. No. 15/262,318, filed Sep. 12, 2016.
U.S. Appl. No. 15/262,332, filed Sep. 12, 2016.
Design U.S. Appl. No. 29/590,781, filed Jan. 13, 2017.
U.S. Appl. No. 15/592,745, filed May 11, 2017.
U.S. Appl. No. 15/606,326, filed May 26, 2017.
U.S. Appl. No. 15/606,658, filed May 26, 2017.
U.S. Appl. No. 15/607,555, filed May 29, 2017.
Russian Search Report from RU patent application No. 2015141108 dated Sep. 7, 2016.
European Search Report dated Dec. 11, 2017 with regard to the counterpart patent application EP 17 18 9557.
Xiao et al., "Research and Implementation of Hybrid Recommendation Algorithm Based on Collaborative Filtering and Word2Vec", 8th International Symposium on Computational Intelligence and Design, 2015, pp. 172-175.
Koren et al., "Matrix Factorization Techniques for Recommender Systems", IEEE Computer Society, Computer, vol. 42, No. 8, 2009, pp. 42-49.
European Search Report dated Sep. 14, 2017 with regard to the counterpart patent application EP 17 18 0212.
European Search Report dated Sep. 18, 2017 with regard to the counterpart patent application EP 17 18 0214.
RU Search Report (completion date: May 25, 2017) with regard to the counterpart patent application RU 2016127446.
English Abstract for RU2013101601 retrieved on Espacenet on Nov. 2, 2017.
Youtube Account: RnStore, "Zmags Demo", (May 19, 2011 ), times stamp 1:54/3:56, 2:20/3:56, PDF Attached, URL: https://www.

(56) References Cited

OTHER PUBLICATIONS youtube.com/watch?v=AsBrLdoEJgA, received from USPTO on May 11, 2018 with regard to the U.S. Appl. No. 15/263,493.
Youtube Account: iappletech128, "Close Tabs in Safari by Swiping", (Oct. 20, 2013), time stamp 0:20-0:35/1 :18, PDF Attached, URL: https://www.youtube.com/watch?v=V8TTbYrFSmg, received from USPTO on May 11, 2018 with regard to the U.S. Appl. No. 15/263,493.
Youtube Account: macmostvideo, "Viewing Photos With the Finder (MacMost Now 612)", (Septemeber 30, 2011 ), time stamp 2:05-2:25, PDF Attached, URL: https://www.youtube.com/watch?v=tYoJI6G7Hkg, received from USPTO on May 11, 2018 with regard to the U.S. Appl. No. 15/263,493.
European Examination Report with regard to the counterpart patent application No. EP 16190999.9 dated Jun. 29, 2018.
U.S. Appl. No. 16/010,152, filed Jun. 15, 2018.
Notice of Allowance with regard to the counterpart U.S. Appl. No. 15/592,745 dated Oct. 11, 2018.
Disclosed Anonymously, "System, Method and Computer Program Product for Generating a Relationship-Based Recommendation", Apr. 28, 2006, 21 pages.
Jim Bainbridge et al., "IBM DB2 Web Query for I Tutorials", Apr. 13, 2017, 570 pages.
U.S. Appl. No. 16/009,929, filed Jun. 15, 2018.
Design U.S. Appl. No. 29/703,684, filed Aug. 29, 2019.
U.S. Appl. No. 16/370,286, filed Mar. 29, 2019.
U.S. Appl. No. 16/372,553, filed Apr. 2, 2019.
U.S. Appl. No. 16/371,624, filed Apr. 1, 2019.
U.S. Appl. No. 16/503,546, filed Jul. 4, 2019.
Office Action with regard to the counterpart U.S. Appl. No. 16/371,624 dated Dec. 9, 2020.
Office Action with regard to the U.S. Appl. No. 15/607,555 dated Dec. 9, 2021.
Office Action with regard to the U.S. Appl. No. 16/009,929 dated Dec. 3, 2021.
Jamali, Mohsen et al., "TrustWalker: A Random Walk Madel for Combining Trust-based and Item-based Recommendation." KDD'09, Jun. 28-Jul. 1, 2009, Paris, France. (Year: 2009).
Notice of Allowance with regard to the U.S. Appl. No. 16/371,624 dated Jan. 20, 2022.
"The impact of ad positioning in search engine targeting: a multifeceted decision problem," by Carsten D. Schultz, Electronic Commerce Research, New York: Springer Nature B.V., Jun. 29, 2018 (Year: 2018).
"Identify, Match, and Target-Penton's Audience-Based Targeting Reaches the Right Individual, Audience, or Company to Accelerate Marketing Programs," PR Newswire, PR Newswire Associated LLC, Aug. 11, 2016 (Year: 2016).

* cited by examiner

METHOD AND SYSTEM FOR MEETING SERVICE LEVEL OF CONTENT ITEM PROMOTION

CROSS-REFERENCE

The present application claims priority to Russian Patent Application No. 2019128258, entitled "Method and System for Meeting Service Level of Content Item Promotion", filed on Sep. 9, 2019, the entirety of which is incorporated herein by reference.

FIELD

The present technology relates to computer-implemented recommendation systems in general and specifically to methods and systems for meeting a service level of digital content item promotion.

BACKGROUND

Various global or local communication networks (the Internet, the World Wide Web, local area networks and the like) offer a user potential access to a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to access the information, including under the form of rich content (like images, audio, video, animation, and other multimedia content from such networks).

The amount of such information available to a user has grown exponentially over time. Several solutions have been developed in order to allow finding the information that the user is looking for. One example of such a solution is a search engine. Upon query formulated by the user, a search engine will present a ranked list of Internet resources that are potentially relevant to the query. The user can then browse the ranked list of search results in order to obtain information she/he is interested in.

Other solutions have been devised consisting in recommendation services that do recommend content to the user, allowing him/her to discover information that he/she may not be interested in, or capable of, formulating a query for. Such services make content recommendations to the user without an express search query, based on past explicit or implicit interests of the user, with the goal that such content also be of likely interest.

An example of such a recommendation service is FLIPBOARD™: such system aggregates and recommends content from various sources, where the user can "flip" through the pages with the recommended/aggregated content. The recommendation system collects content from Erreur ! Référence de lien hypertexte non valide. and other websites, presents it in magazine format, and allows users to "flip" through their social-networking feeds and feeds from websites that have partnered with the company, effectively "recommending" content to the user even though the user may not have expressly expressed her/his desire in the particular content.

Another example is Toutiao™, a news and information application that recommends personalized information for individual users based on analyzing content features, user features and their interaction with content, and using algorithms and artificial intelligence techniques to generate customized news feed.

Yet another example is Facebook™ News Feed that compares the merits of thousands of potential posts every time the Facebook™ app is opened, showing users personalized results about information deemed interesting to them and providing a meaningful experience, over that of clicks, reactions, or reading time.

Finally another example is YANDEX.ZEN™ recommendation system. The Yandex.Zen recommendation system recommends digital content (such as articles, news, and video in a personalized feed on the Yandex.Browser start screen). As the user browses the Yandex.Zen server recommended content, the server acquires explicit (by asking whether the user likes to see more of such content in the user's feed) or implicit (by observing user content interactions) feedback. Using the user feedback, the Yandex.Zen server continuously improves the content recommendations presented to the given user.

Recommendations in such services may take the form of proposals of a link to a particular content (associated with an abstract of the content, a picture etc.) that users may click on to access the content. Other types of "action" on the part of users may be characterized by visiting a website, reading the whole content, sharing content with others, etc.

SUMMARY

It has been appreciated by the developers of the present technology that a recommendation service needs to also include an optional, and as the case may be, paid promotion service, allowing authors, or owners or controlling parties, of a particular digital content item to increase such item's popularity by triggering extra showing of it. Extra showing may for example take the form of displaying the item on users' screens, in a more visible or prominent manner, or more frequently, as part of the recommendation service to users.

It has also been appreciated by the developers of the present technology that any such optional promotion service requires a measure of success of the promotion. Such measure may for example take the form of an attained number of users taking an action over the promoted digital content item, during a period of time. An action in such context is a desired behavior initiated by the user as a result of promotion, such as clicks, visiting websites, sharing content or other.

It has finally been appreciated by the developers of the present technology that any such optional promotion service should offer subscribers to the service, both the possibility to request a target level of promotion success measure for the digital content item, and to obtain the guarantee that such target will be met.

Embodiments of the present technology have been developed based on developers' appreciation that the processing power requirement for efficient execution is an important drawback of promotion services with service level requirements since operators need to either (i) acquire more processing power units, which is monetarily expensive or (ii) recommend a promoted digital content item with less relevance and to more users, at the expense of the user satisfaction with recommended digital content.

As such, the developers have developed a solution where a selection of users to whom a promoted digital content item is recommended is optimized (ie: minimized) for the promotion service to reach the required service level.

In accordance with a first broad aspect of the present technology, there is provided a method for meeting a service level of content item promotion, the method being executable by a server hosting a recommendation service for providing a plurality of digital content items to a user, and the user being one of a plurality of users of the service. Data representative of the history of interactions of the plurality of users of the service with digital content items and data representative of the digital content items are stored in a storage communicatively coupled to the server. The method comprises:

receiving by the server a request for a promotion of one of the plurality of digital content items with a requested service level, the service level request including indications of:
a target number of users being provided the one digital content item and taking an action over it; and
a target period of time;
calculating by the server a distribution within the plurality of users of the service of the probability of taking an action when being provided the one digital content item;
estimating by the server a potential number of users within the plurality of users of the service to which the one digital content item may be provided during the target period of time;
calculating by the server a threshold of probability within the distribution, based including on:
the target number of users in the service level request;
the calculated distribution; and
the estimated potential number of users; and
providing by the server the one digital content item to users within the plurality of users of the service having a probability within the distribution that is above the threshold.

In embodiments of the present technology, the calculating the distribution of probability comprises correlating, by the server, data representative of the one digital content item, with data representative of the history of interaction with each one of the plurality of users of the service.

In embodiments of the present technology, the correlating comprises:

generating by the server a first vector representative of the one digital content item, and a respective second vector representative of the history of interaction of one of the plurality of users of the recommendation service;
projecting by the server the first and the respective second vector into a multi dimensional space;
calculating by the server an angle between the first vector and the respective second vector; and
repeating by the server the steps of generating the respective second vector, projecting the first vector and the respective second vector, and calculating the angle between the first vector and the respective second vector, for each one of the plurality of users of the recommendation service.

In embodiments of the present technology, the generating and projecting are executed using a Machine Learning Algorithm (MLA).

In embodiments of the present technology the calculating the distribution of probability is executed by the server for a plurality of classes of users of the service.

In embodiments of the present technology, the estimating the potential number of users comprises tracking by the server historical data about the number of users of the recommendation service over a period of time.

In embodiments of the present technology, the tracking historical data comprises tracking by the server the geographical location of users of the recommendation service.

In embodiments of the present technology, the estimating the potential number of users comprises accounting by the server for a time of day, week or year the target period of time starts.

In embodiments of the present technology, the estimating the potential number of users comprises accounting by the server for a time of day, week or year the target period of time starts, relative to the geographical location of users of the recommendation service.

In embodiments of the present technology, the estimating the potential number of users is executed by a Machine Learning Algorithm (MLA).

In embodiments of the present technology, the request for the promotion of one of the plurality of digital content items with the requested service level is sent by a publisher, and the method further comprises reporting by the server to the publisher that the service level has been met.

In accordance with a second broad aspect of the present technology, there is provided a server for meeting a service level of content item promotion, the server hosting a recommendation service for providing a plurality of digital content items to a user, the user being one of a plurality of users of the service. Data representative of the history of interactions of the plurality of users of the service with digital content items and data representative of the digital content items are stored in a storage communicatively coupled to the server. The server is configured to:

receive a request for a promotion of one of the plurality of digital content items with a requested service level, the service level request comprising indications of:
a target number of users being provided the one digital content item and taking an action over it; and
a target period of time;
calculate a distribution within the plurality of users of the service of the probability of taking an action when being provided the one digital content item;
estimate a potential number of users within the plurality of users of the service to which the one digital content item may be provided during the target period of time;
calculate a threshold of probability within the distribution, based including on:
the target number of users in the service level request;
the calculated distribution; and
the estimated potential number of users; and
provide the one digital content item to users within the plurality of users of the service having a probability within the distribution that is above the threshold.

In embodiments of the present technology, the server is further configured to correlate data representative of the one digital content item, with data representative of the history of interaction with each one of the plurality of users of the service.

In embodiments of the present technology, the server is further configured to:
generate a first vector representative of the one digital content item, and a respective second vector representative of the history of interaction of one of the plurality of users of the recommendation service;
project the first and the respective second vector into a multi dimensional space;
calculate an angle between the first and the respective second vector; and
repeat the generating the respective second vector, projecting the first vector and the respective second vector, and calculating the angle between the first vector and the respective second vector, for each one of the plurality of users of the recommendation service.

In embodiments of the present technology, the server is further configured so that the generating and projecting are executed using a Machine Learning Algorithm (MLA).

In embodiments of the present technology, the server is further configured to calculate a distribution of probability for a plurality of classes of users of the service.

In embodiments of the present technology, the server is further configured so that the estimating the potential number of users comprises tracking historical data about the number of users of the recommendation service over a period of time.

In embodiments of the present technology, the server is further configured to track the geographical location of users of the recommendation service.

In embodiments of the present technology, the server is further configured to account for a time of day, week or year the target period of time starts.

In embodiments of the present technology, the server is further configured to account for a time of day, week or year the target period of time starts, relative to the geographical location of users of the recommendation service.

In embodiments of the present technology, the server is further configured so that the estimating is executed by a Machine Learning Algorithm (MLA).

In embodiments of the present technology, the server is further configured to receive the request for a promotion of one of the plurality of digital content items with a requested service level sent by a publisher, and to report to the publisher that the service level has been met.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
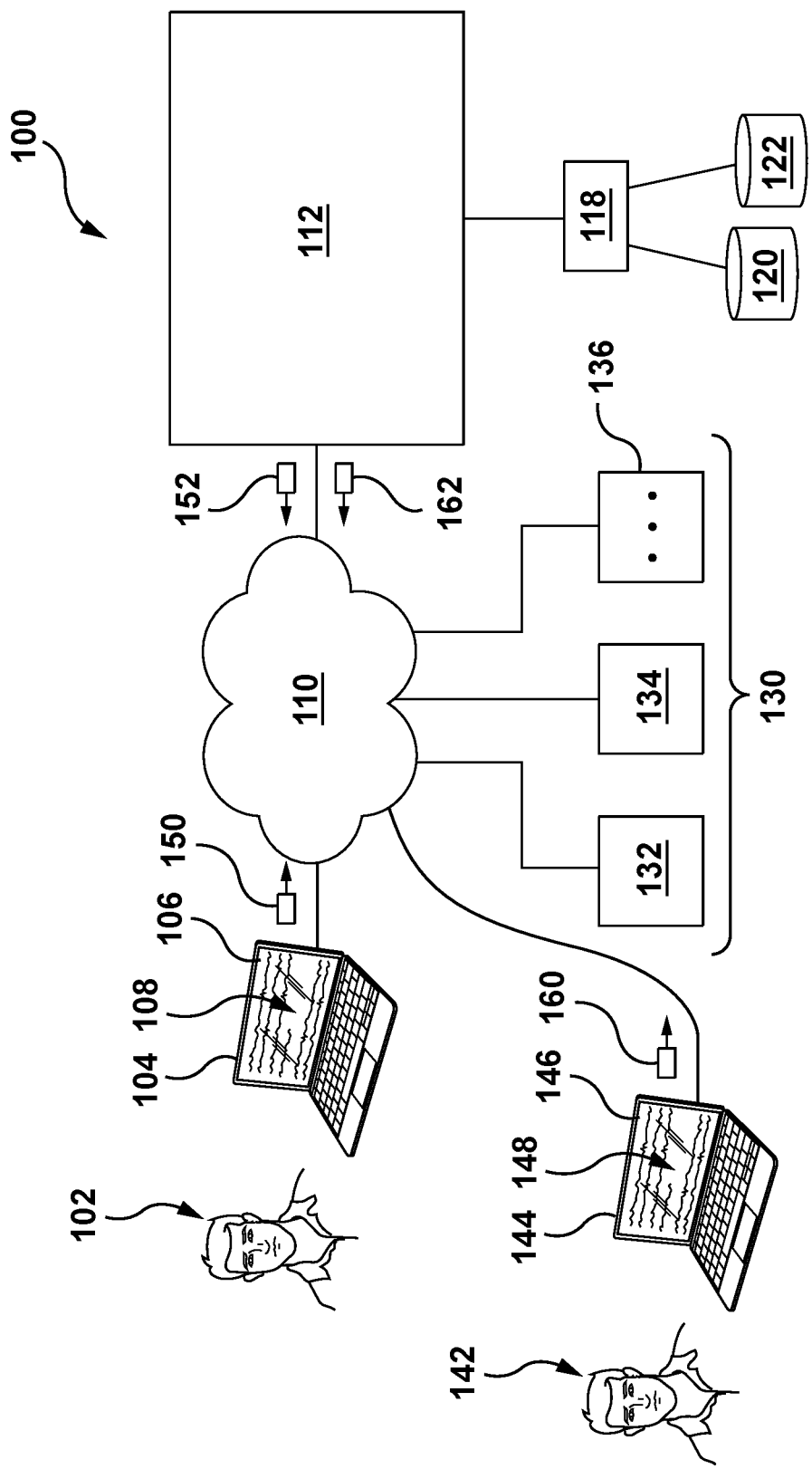
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide digital content recommendations to users of the system 100, with an optional possibility for digital content owners to promote certain digital content items as part of those digital content recommendations. For example, a user 102 (a given one of a plurality of users of the system 100) may be a subscriber to a recommendation service provided by the system 100. However, the subscription does not need to be explicit or paid for. For example, the user 102 can become a subscriber by virtue of downloading a recommendation application from the system 100, by registering and provisioning a log-in/password combination, by registering and provisioning user preferences and the like. As such, any system variation configured to generate content recommendations with optional promotion for the given user can be adapted to execute embodiments of the present technology, once teachings presented herein are appreciated. Furthermore, the system 100 will be described using an example of the system 100 being a promotion system (therefore, the system 100 can be referred to herein below as a "promotion system 100"). However, embodiments of the present technology can be equally applied to other types of the system 100, as will be described in greater detail herein below.

Electronic Device—User

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

It should be noted that, although only the user 102 associated with the electronic device 104 is depicted in FIG. 1, it is contemplated that the user 102 associated with the electronic device 104 is a given user from the plurality of users of the system 100, and where each one of the plurality of users (not depicted) can be associated with a respective electronic device (not depicted).

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a recommendation application 106. Generally speaking, the purpose of the recommendation application 106 is to enable the user 102 to receive (or otherwise access) digital content recommendations provided by the system 100, as will be described in greater detail herein below.

How the recommendation application 106 is implemented is not particularly limited. One example of the recommendation application 106 may include the user 102 accessing a web site associated with the recommendation service to access the recommendation application 106. For example, the recommendation application 106 may be accessed by typing in (or otherwise copy-pasting or selecting a link) an URL associated with the recommendation service. Alternatively, the recommendation application 106 may be an application downloaded from a so-called "app store", such as APPSTORE™ or GOOGLEPLAY™ and installed/executed on the electronic device 104. It should be expressly understood that the recommendation application 106 may be accessed using any other suitable means. In yet additional embodiments, the recommendation application 106 functionality may be incorporated into another application, such as a browser application (not depicted) or the like. For example, the recommendation application 106 may be executed as part of the browser application, for example, when the user 102 starts the browser application, the functionality of the recommendation application 106 may be executed.

Generally speaking, the recommendation application 106 comprises a recommendation interface 108, the recommendation interface 108 being displayed on a screen (not separately numbered) of the electronic device 104.

The electronic device 104 is configured to generate a request 150 for digital content recommendation. The request 150 may be generated in response to the user 102 providing an explicit indication of the user's desire to receive a digital content recommendation.

Communication Network

The electronic device 104 is communicatively coupled to a communication network 110 for accessing a recommendation and promotion server 112 (or simply the server 112).

In some non-limiting embodiments of the present technology, the communication network 110 may be implemented as the Internet. In other embodiments of the present technology, the communication network 110 can be implemented differently, such as any wide-area communication network, local-area communication network, a private communication network and the like.

How a communication link (not separately numbered) between the electronic device 104 and the communication network 110 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

Plurality of Network Resources

Also coupled to the communication network 110 is a plurality of network resources 130 that includes a first network resource 132, a second network resource 134 and a plurality of additional network resources 136. The first network resource 132, the second network resource 134 and the plurality of additional network resources 136 are all network resources accessible by the electronic device 104 (as well as other electronic devices potentially present in the system 100) via the communication network 110. Respective digital content of the first network resource 132, the second network resource 134 and the plurality of additional network resources 136 is not particularly limited.

It is contemplated that any given one of the first network resource 132, the second network resource 134 and the plurality of additional network resources 136 may host (or in other words, host) digital documents having potentially different types of digital content.

For example, digital content of digital documents may include but is not limited to: audio digital content for streaming or downloading, video digital content for streaming or downloading, news, blogs, information about various government institutions, information about points of interest, thematically clustered content (such as content relevant to those interested in kick-boxing), other multi-media digital content, and the like.

In another example, digital content of the digital documents hosted by the first network resource 132, the second network resource 134 and the plurality of additional network resources 136 may be text-based. Text-based digital content may include but is not limited to: news, articles, blogs, information about various government institutions, information about points of interest, thematically clustered digital content (such as digital content relevant to those interested in kick-boxing), and the like.

It should be noted that "text-based" digital content does not intend to mean that the given digital document only contains text to the exclusion of other type of multi-media elements. On the contrary, the given text-based digital document may include text elements, as well as potentially other type of multi-media elements. For instance, a given text-based digital document that is an article may include text, as well as photos. As another example, a given text-based digital document that is a blog may include text, as well as embedded video elements.

It should be noted that digital content of a given network resource may be published by a publishing entity. Generally speaking, a given publishing entity publishes digital content (that it owns or controls) such that the digital content becomes available on a given network resource. It should be noted that a given publishing entity usually generates and publishes digital content having a common type and/or common topic. For example, a given publishing entity that usually publishes digital content related to sport news, is likely to publish new digital content also related to sport news.

It is contemplated that in some embodiments of the present technology, a given one of the plurality of network resources 130 may be associated with one or more publishing entities. In other embodiments of the present technology, a given publishing entity may be associated with one or more of the plurality of network resources 130, without departing from the scope of the present technology.

Generally speaking, digital content is potentially "discoverable" by the electronic device 104 via various means. For example, the user 102 of the electronic device 104 may use a browser application (not depicted) and enter a Universal Resource Locator (URL) associated with the given one of the first network resource 132, the second network resource 134 and the plurality of additional network resources 136. In another example, the user 102 of the electronic device 104 may execute a search using a search engine (not depicted) to discover digital content of one or more of the first network resource 132, the second network resource 134 and the plurality of additional network resources 136. As has been mentioned above, these are useful when the user 102 knows apriori which digital content the user 102 is interested in.

Electronic Device—Publisher

The system 100 further comprises an electronic device 144, the electronic device 144 being associated with a publisher 142. As such, the electronic device 144 can sometimes be referred to as a "publisher device". It should be noted that the fact that the electronic device 144 is associated with the publisher 142 does not need to suggest or imply any mode of operation—such as a need to log in, a need to be registered, or the like.

It should be noted that, although only the publisher 142 associated with the electronic device 144 is depicted in FIG. 1, it is contemplated that the publisher 142 associated with the electronic device 144 is a given publisher from the plurality of publishers using the system 100, and where each one of the plurality of publishers (not depicted) can be associated with a respective electronic device (not depicted).

The implementation of the electronic device 144 is not particularly limited, but as an example, the electronic device 144 may be implemented as a personal computer (desktops, laptops, netbooks, etc.), a wireless communication device (such as a smartphone, a cell phone, a tablet and the like), as well as network equipment (such as routers, switches, and gateways). The electronic device 144 comprises hardware and/or software and/or firmware (or a combination thereof), as is known in the art, to execute a promotion application 146.

Generally speaking, the purpose of the promotion application 146 is to enable the publisher 142 to promote digital content items under its ownership or control, amongst digital content recommendations provided by the system 100, as will be described in greater detail herein below.

How the promotion application 146 is implemented is not particularly limited. One example of the promotion application 146 may include the publisher 142 accessing a web site associated with the recommendation service to access the promotion application 146. For example, the promotion application 146 may be accessed by typing in (or otherwise copy-pasting or selecting a link) an URL associated with the recommendation service. Alternatively, the promotion application 146 may be an application downloaded from a so-called "app store", such as APPSTORE™ or GOOGLE-PLAY™ and installed/executed on the electronic device 104. It should be expressly understood that the promotion application 146 may be accessed using any other suitable means. In yet additional embodiments, the promotion application 146 functionality may be incorporated into another application, such as a recommendation application, a browser application (not depicted) or the like. For example, the promotion application 146 may be executed as part of the browser application. For example, when the publisher 142 starts the browser application, the functionality of the promotion application 146 may be executed.

Generally speaking, the promotion application 146 comprises a promotion interface 148, the promotion interface 148 being displayed on a screen (not separately numbered) of the electronic device 144.

The electronic device 144 is configured to generate a request 160 for digital content promotion. The request 160 may be generated in response to the publisher 142 providing an explicit indication of the publisher's desire to promote a particular digital content.

Recommendation and Promotion Server

The server 112 may be implemented as a computer server. In an example of an embodiment of the present technology, the server 112 may be implemented as a Dell™ PowerEdge™ Server running the Microsoft™ Windows Server™ operating system. The server 112 may be implemented in any other suitable hardware, software, and/or firmware, or a combination thereof. In the depicted non-limiting embodiments of the present technology, the server 112 is a single server. In alternative non-limiting embodiments of the present technology, the functionality of the server 112 may be distributed and may be implemented via multiple servers.

Generally speaking, the server 112 is configured to receive from the electronic device 104 the request 150 for digital content recommendation, and from the electronic device 144 the request 160 for digital content item promotion. The server 112 is further configured to responsive to the request 150, generate a recommended digital content message 152 to be transmitted to the electronic device 104, and responsive to the request 160, generate a digital content promotion message 162 to be transmitted to the electronic device 144.

Examples of the implementation of the recommendation interface 108, as well as an explanation of how the user 102 may interact with the recommendation interface 108 and/or make requests 150 for digital content recommendation, are disclosed in a co-owned U.S. patent application entitled "A COMPUTER-IMPLEMENTED METHOD OF GENERATING A CONTENT RECOMMENDATION INTERFACE", filed on May 11, 2017 and bearing a publication number US20170329490A1; content of which is incorporated by reference herein in its entirety in jurisdictions allowing such incorporation by reference.

Examples of the implementation of the promotion interface 148, as well as an explanation of how the publisher 142 may interact with the promotion interface 148 to make requests 160 for digital content item promotion, are described below.

Data Storage Device

The server 112 is communicatively coupled to a data storage device 118. The data storage device 118 is depicted as a separate entity from the server 112. However, it is contemplated that the data storage device 118 may be implemented integrally with the server 112, without departing from the scope of the present technology. Alternatively, functionalities of the data storage device 118 as described below may be distributed between more than one storage device.

Generally speaking, the data storage device 118 is configured to store data generated, retrieved and/or processed by the server 112 for temporary and/or permanent storage thereof. For example, the data storage device 118 may be configured to store inter alia data resulting from the execution of the at least some of the plurality of computer-implemented procedures described herein below.

The data storage device 118 includes a digital content database 120. As mentioned above, the digital content database 120 may be populated by the server 112. The digital content database 120 stores, for instance, information about digital content discovered and catalogued by the server 112. The digital content database 120 may store, in another instance, information about respective digital content items that are potentially recommendable by the server 112 to users of the recommendation service. The digital content database 120 may also store, in yet another instance, information about respective digital content items that may be promoted by the server 112 to users of the optional promotion service.

In some embodiments, the digital content database 120 may further store information about network resources of at least some digital content items that are potentially recommendable, or that may be promoted by the server 112. For example, the server 112 may be configured to populate the digital content database 120 with digital content items in association with respective network resources 132-136.

In other embodiments, the digital content database 120 may further store information about respective publishers of at least some digital content items that are potentially recommendable or may be promoted by the server 112. For example, the server 112 may be configured to populate the digital content database 120 with digital content items in association with respective publishers.

Additionally or optionally, it is contemplated that the server 112 may be configured to populate the digital content database 120 with digital content items in association with respective network resources and in association with respective publishers, without departing from the scope of the present technology.

For example, the server 112 may collect information about a general popularity of given digital content amongst users of the recommendation service (for example, in case of given digital content being a music track, how many times the given music track has been listened to/downloaded).

In another example, the server 112 may collect information about digital content-inherent characteristics (in case of given digital content being a music track—length of the track, the genre of the track, audio-characteristic of the track; other digital content-inherent characteristics include: the price of the given digital content, the category of the given digital content, the length measured in words or symbols of the given digital content).

Other information about the digital content may also be stored in the digital content database 120 without departing from the scope of the present technology.

The data storage device 118 also includes a user database 122. The user database 122 stores information about user-item interactions of the recommendation service of the system 100 (such as the user 102 and other potential users, for example). As mentioned above, the user database 122 may be populated by the server 112.

In some embodiments, the user database 122 may be populated with user-item interaction data tracked and gathered by the server 112.

In other embodiments, it is contemplated that the user database 122 may be further populated with user-item interaction data estimated by the server 112.

It should be understood that the user database 122 may be populated with user-item interaction data at different digital content item levels. For example, as previously alluded to, the user database 122 may be populated with user-item interaction data on the digital document level and/or on the network resource level and/or on the publisher level, without departing from the scope of the present technology. Also, as previously mentioned, the user database 122 may be populated with user-item interaction data of a given user with a given digital content item in a form of user events that occurred (and/or that have not occurred but are estimated) between the given user and the given digital content item.

It is contemplated that in some embodiments of the present technology, user-item interaction data may be classified in the user database 122 by respective types of user-item interaction data. In some embodiments, types of user-item interaction data may correspond to types of users events that occurred (and/or that have not occurred but are estimated) between users and digital content items.

For example, a first type of user-item interaction data may be a number of "clicks", a second type of user-item interaction data may be a number of "likes", while a third type of user-item interaction data may by an amount of "interaction time". It should be noted that user-item interaction data may be classified in the user database 122 based on respective types of user-item interaction data which are additional and/or different from those non-exhaustively listed above, and without departing from the scope of the present technology.

Other information about the history of interactions between users and digital content items may also be stored in the user database 122 without departing from the scope of the present technology.

In additional embodiments of the present technology, the user database 122 may be populated with additional information about the plurality of users of the recommendation service and of the optional promotion service. For example, the server 112 may be configured to collect and store in the user database 122 user-profile data associated with the plurality of users 102 and publishers 142 of the system 100 such as, but not limited to: name, age, gender, user-selected types of digital content that (s)he desires, and the like. Other information about the plurality of users 102 and publishers 142 of the recommendation service and of the optional promotion service may also be stored in the user database 122.

The user data base 122 is depicted as a separate physical entity from the digital content database 120. However, it is contemplated that the user data base 122 and the digital content database 120 may be separate logical entities part of a single physical entity, without departing from the scope of the present technology With reference to FIG. 2, there is depicted a screen shot of the promotion interface 148 implemented in accordance with a non-limiting embodiment of the present technology (the example of the promotion interface 148 being depicted as displayed on the screen of the electronic device 144 being implemented as a smart phone).

In some embodiments of the present technology the promotion interface 148 may be presented/displayed when the publisher 142 of the electronic device 144 actuates (i.e. executes, run, background-run or the like) the promotion application 146. Alternatively, the promotion interface 148 may be presented/displayed when the publisher 142 opens a new browser window and/or activates a new tab in the browser application. For example, in some embodiments of the present technology, the promotion interface 148 may act as a "home screen" in the browser application.

Figure 2:
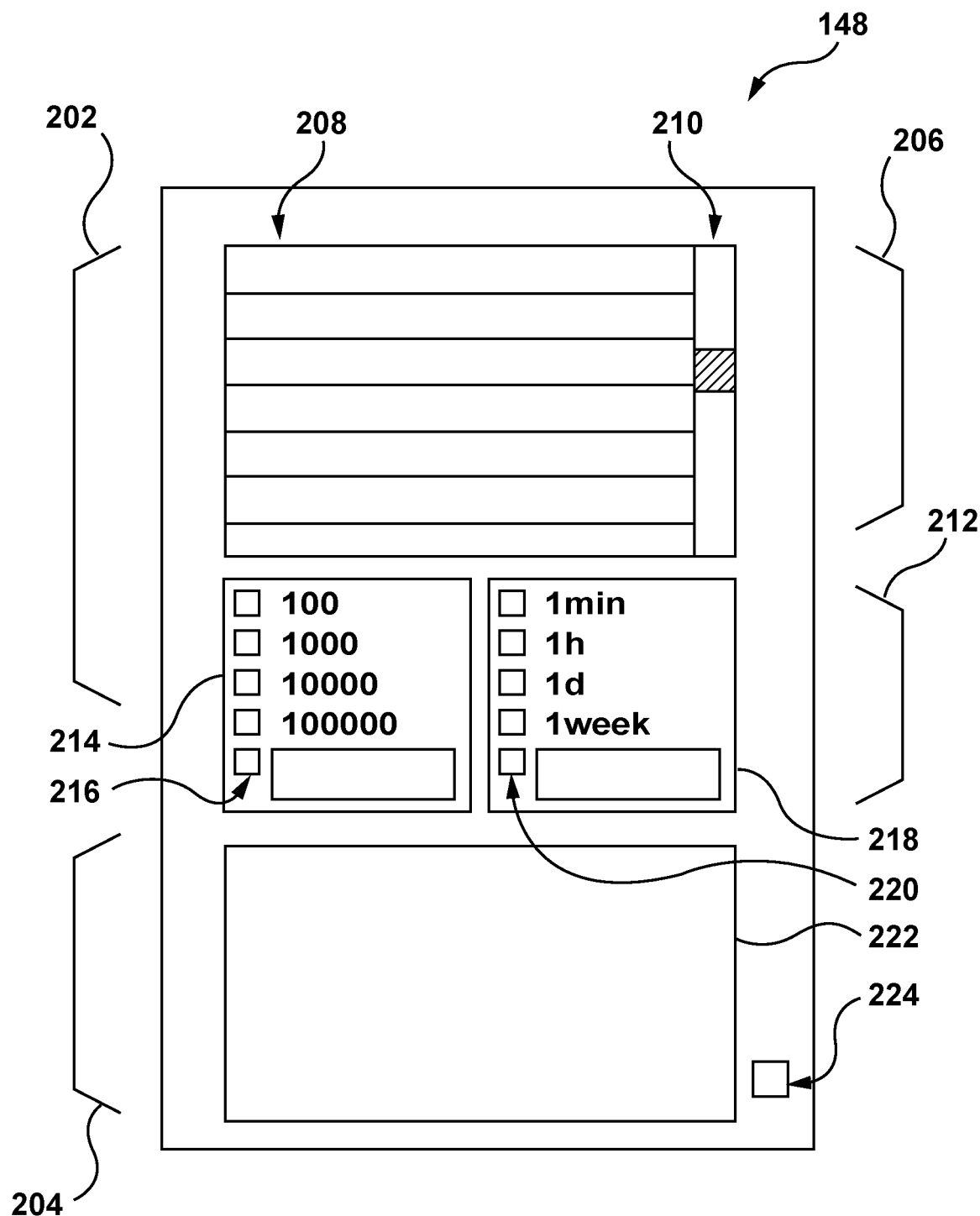
FIG. 2 depicts a screen shot of a promotion interface implemented in accordance with a non-limiting embodiment of the present technology, the promotion interface being depicted as displayed on the screen of an electronic device of the system of FIG. 1.

The promotion interface 148 includes a promotion request interface 202. The promotion request interface 202 includes:

a links interface 206. The links interface 206 includes a plurality of tiles 208—of which seven are depicted in FIG. 2. The plurality of tiles 208 is scrollable by the publisher 142 actuating a scroll bar 210. Each of the plurality of tiles 208 includes (or acts as) a link to digital content items that the publisher 142 owns or controls, and which are stored in one or several of the plurality of network resources 130 to 136. The number and content of the individual ones of the plurality of tiles 208 is not particularly limited. The publisher 142 may click on one or several of the tiles 208 to select one or several particular digital content items for which a promotion is desired.

The plurality of tiles 208, in the depicted embodiment, is visually presented to the publisher 142 as rectangular buttons with a logo and/or a name of the digital content item depicted therein, the logo and/or the name for enabling the publisher 142 to identify which digital content item(s) it is requesting to be promoted. However, it should be expressly understood that the visual representation of some or all of the plurality of tiles 208 may be different. As such, some or all of the plurality of tiles 208 may be implemented as differently shaped buttons, as hyperlinks presented in a list or the like.

The number of the tiles within the plurality of tiles 208 may be pre-selected by the provider of the promotion application 146. In some embodiments of the present technology, the number of tiles within the plurality of tiles 208 may be pre-selected based on the size and/or resolution of the screen of the electronic device 144 executing the promotion application 146. For example, a first number of tiles may be pre-selected for the electronic device 144 executed as a smartphone, a second number of tiles may be pre-selected for the electronic device 144 executed as a tablet, and a third number of tiles may be pre-selected for the electronic device 144 executed as a laptop or desktop computer.

In some embodiments of the present technology, the links interface 206 is configured to also provide to the publisher 142 the information of the location of the digital content items in one or several of the plurality of network resources 130 to 136.

a service level interface 212. The service level interface 212 includes two display areas 214 and 218.

Display area 214 provides a number of boxes 216 which the publisher 142 may tick to indicate to the promotion application 146 the target number (hereafter: "$T_{users}$" parameter) of users 102 to take an action over a particular digital content item selected through links interface 206, when such selected item is provided to such users 102 by the recommendation application 106.

The plurality of boxes 216, in the depicted embodiment, is visually presented to the publisher 142 as square buttons accompanied with a legend to indicate a corresponding number of target users. One of the boxes may be accompanied with a free form entry field in which the publisher 142 may type a custom target number. However, it should be expressly understood that the visual representation of some or all of the plurality of boxes 216, and the granularity of figures in the accompanying legends may be different. As such, some or all of the plurality of boxes 216 may be implemented as differently shaped buttons, as hyperlinks presented in a list or the like.

In some embodiments of the present technology, a target number of users is selected by default of publisher 142 expressly selecting or typing in one.

Display area 218 provides a number of boxes 220 the publisher 142 may tick to indicate to the promotion application 146 the target period of time (hereafter: "$T_{period}$" parameter) over which the target number $T_{users}$ of users 102 to take an action over the particular selected digital content item should be reached.

The plurality of boxes 220, in the depicted embodiment, is visually presented to the publisher 142 as square buttons accompanied with a legend to indicate a corresponding time period. One of the boxes may be accompanied with a free form entry field in which the publisher 142 may type a custom time period. However, it should be expressly understood that the visual representation of some or all of the plurality of boxes 220, and the granularity of figures in the accompanying legends may be different. As such, some or all of the plurality of boxes 220 may be implemented as differently shaped buttons, as hyperlinks presented in a list or the like.

In some embodiments of the present technology, a target time period is selected by default of publisher 142 expressly selecting or typing in one.

In some other embodiments of the present technology, a price is indicated to the publisher 142 by the promotion application 146 for the service of promoting a particular digital content item selected through the links interface 206, with the user $T_{users}$ and time period $T_{period}$ targets entered through the service level interface 212.

The promotion interface 148 further includes a confirmation interface 204. In a window 222 a list is displayed by the promotion application 146, of the one or several selected particular digital content items for which a promotion is desired, as entered by the publisher 142 using the links interface 206. Each such digital content item is visually associated with, as entered by the publisher 142 using the service level interface 212, both the target number of users $T_{users}$ to take an action over such digital content item, and the target period of time $T_{period}$ over which the value of $T_{users}$ should be reached.

A button 224 serves, once ticked, as a confirmation by the publisher 142 that the displayed information in the window 222 is correct. Such information is then sent to the promotion application 146 for processing, including sending a request 160 for digital content promotion to the server 112.

Example provided in FIG. 2 is just one possible implementation of the promotion interface 148.

Turning now to computer-implemented procedures to be executed by server 112, examples of how the server 112 may be configured to execute at least some of a plurality of computer-implemented procedures for providing digital content recommendation to the user 102, are disclosed in the aforementiond co-owned United States Patent Application US20170329490A1.

Figure 3:
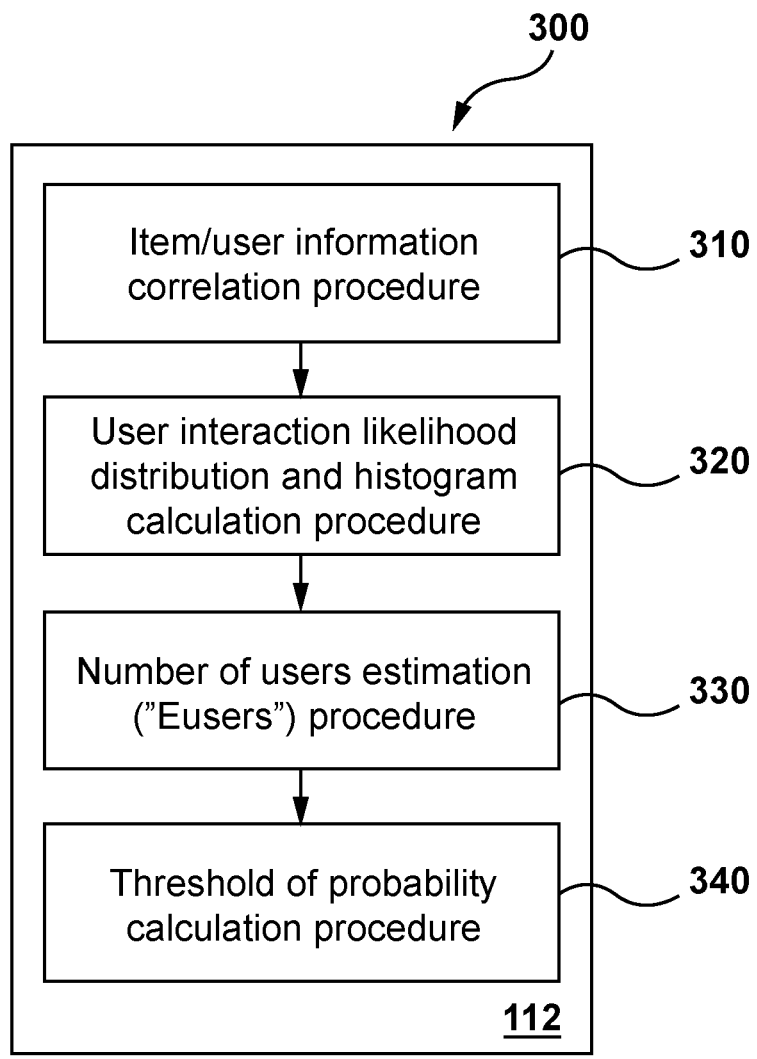
FIG. 3 depicts computer-implemented procedures executed at a server of the system of FIG. 1 in accordance with a non-limiting embodiment of the present technology.

With reference to FIG. 3, the server 112 is further configured to execute at least some of a plurality of computer-implemented procedures 300 for promoting digital content items to the user 102, upon receiving the request 160, sent by the promotion application 146 following an action taken by the publisher 142, and received at the server 112.

It is contemplated that, in order to execute at least some of the plurality of computer-implemented procedures 300, the server 112 may implement one or more Machine Learning Algorithms (MLAs).

It is contemplated that other computer-implemented procedures to those non-exhaustively depicted in FIG. 3 may be implemented by the server 112 for promoting digital content items to users, without departing from the scope of the present technology.

The plurality of computer-implemented procedures 300 includes (i) an item/user information correlation procedure 310, (ii) a user interaction likelihood distribution calculation procedure 320, (iii) a number of users estimation procedure 330, and (iv) a threshold probability calculation procedure 340, which will now be described in turn.

Item/User Information Correlation Procedure

Generally speaking, the item/user information correlation procedure 310 is executed by the server 112 in order to establish scores for users 102 in relation to a digital content item that the publisher 142 requests be promoted by the system 100.

It is contemplated that scores established for users 102 may be subsequently used by the server 112 to generally determine which users 102 to recommend the promoted digital content item to, so as to meet the service level requested by the publisher 142 for the promotion service.

Correlation is between information about the promoted digital content item, and information about each of the users 102, including as the case may be, previous interaction between the promoted digital content item and each of the users 102.

Figure 4:
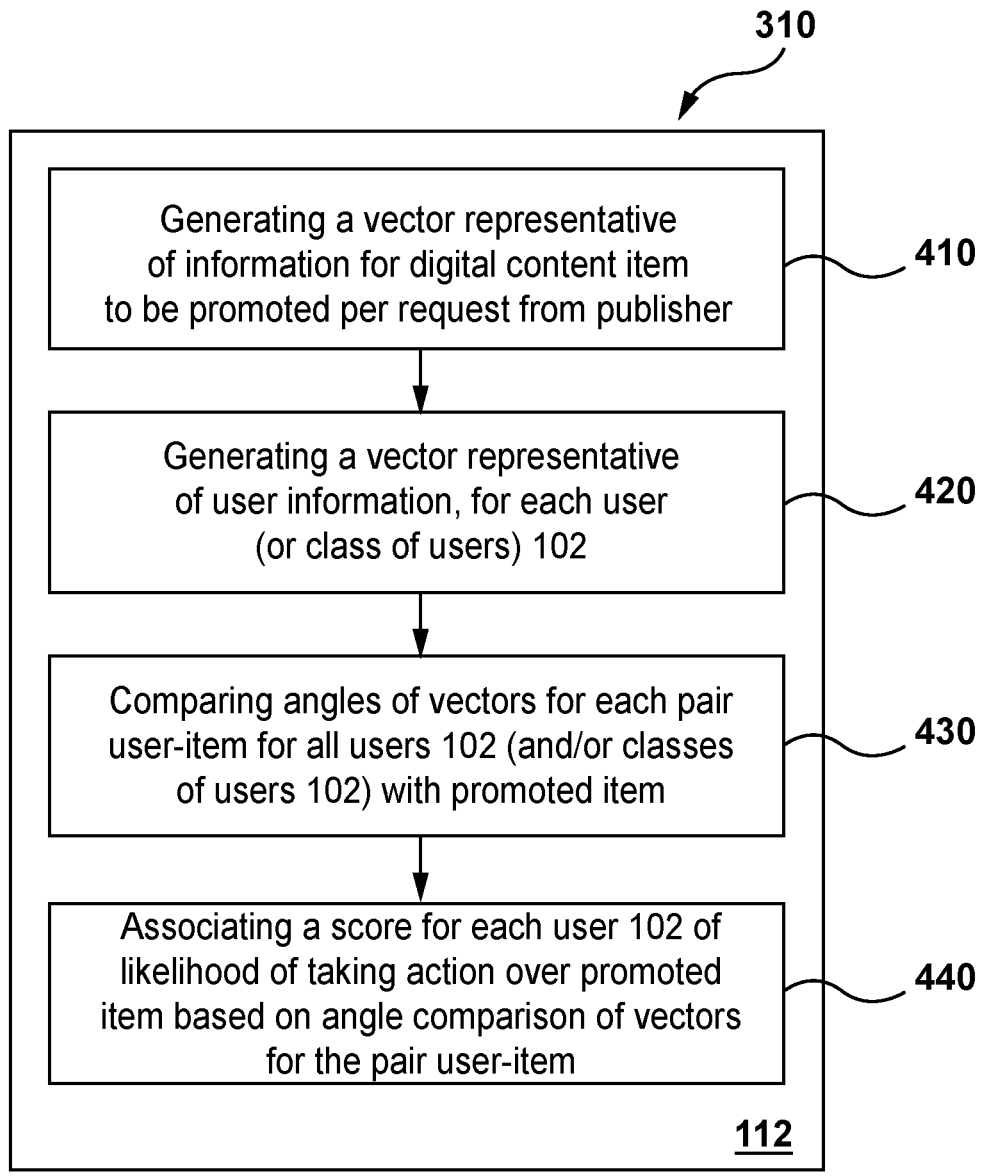
FIG. 4 depicts details of execution of one of computer-implemented procedures of FIG. 3 in accordance with a non-limiting embodiment of the present technology.

Details of one embodiment for correlation procedure 310 are provided hereafter in relation to FIG. 4. It is contemplated that other computer-implemented procedures to those non-exhaustively depicted in FIG. 4 may be implemented by the server 112 for item/user information correlation procedure, without departing from the scope of the present technology.

Tracking and Recording Information about Digital Content Items

Digital content items may be stored in digital content database 120 as populated by the server 112 in the course of providing a recommendation service to users 102. If not previously recommended, digital content items are stored in respective network resources 132-136 and are "discoverable" by users 102 through the electronic device 104. The server 112 may be configured to populate the digital content database 120 with information about the so-discovered and catalogued digital content items for future use, as potentially recommendable to a user 102.

The nature of digital content items is not particularly limited. Some examples of digital content items include, but are not limited to, digital documents such as:
  a news article;
  a publication;
  a web page;
  a post on a social media web site;
  a new application to be downloaded from an app store;
  a new song (music track) to play/download from a given network resource;
  an audiobook to play/download from a given network resource;
  a podcast to play/download from a given network resource;
  a new movie (video clip) to play/download from a given network resource;
  a product to be bought from a given network resource; and
  a new digital document uploaded for viewing on a social media web site (such as a new photo uploaded to an INSTAGRAM™ or FACEBOOK™ account).

It is contemplated that information about digital content items stored by server 112 in digital content database 120 may be related without limitation to item category, text features such bag-of-words, text embeddings, and the like.

Tracking and Recording Information about Users

As part of the recommendation service, the server 112 may track and gather user-item interaction data of the user 102 with a given digital content item in a form of user events that occurred between the given user and the given digital content item.

Examples of different types of user events that may be tracked and gathered by the server 112 include, but are not limited to:
  the given user "scrolled over" the given digital content item;

the given user "liked" the given digital content item;
the given user "disliked" the given digital content item;
the given user "shared" the given digital content item;
the given user "clicked" or "selected" the given digital content item;
the given user spent an amount of "interaction time" consulting the given digital content item; and
the given user purchased/ordered/downloaded the given digital content item.

It is contemplated that, as part of the gathering of data related to user interaction with recommended digital content, the server 112 may be configured to populate a user database 122 with so-tracked and gathered user-item interaction data in association with respective users.

Additionally or optionally, the server 112 may be configured to track, gather and store user-item interaction data of the given user at a "network resource level", where a given digital content item is a given network resource (as opposed to being a given digital document or a given publisher).

Additionally or optionally, the server 112 may be configured to track, gather and store user-item interaction data of the given user at a "publisher level", where a given digital content item is a given publisher (as opposed to being a given digital document or a given network resource).

It is contemplated that information about users stored by server 112 in user database 122 may be related without limitation to points of interest of a user 102, a profile of such user, its known web behavior, its search history, and the like.

Correlation of Item/User Information to Establish Scores for Users

Scores for users 102 are calculated by server 112 as a measure representative of the correlation between users' interests and a digital content item that the publisher 142 requests be promoted by the system 100. The higher the score, the more likely users are to take an action over the particular digital content item when recommended to them by the system 100.

It is contemplated that calculation of scores may be a done for a class of users in place of, or in addition to, individual users. A class of users may for example be those users located in a particular geography, or speaking a particular language.

Generally, different types of information as they relate to digital content items or users are stored in a respective format suitable for representing that type of information. For example, as regard user information, a web-browsing history of a user may be represented as a catalogue of Uniform Resource Identifiers (URIs) of various network resources having been visited by the users. Each URI may be accompanied by a timestamp indicative of a date and time that the network resource was visited and/or a dwell time indicative of the amount of time the user presumably spent viewing the network resource. A geographical history of a user, on the other hand, may be represented by a series of geographical coordinates associated with the user, such as position data collected by a mobile device associated with the user and/or "check-ins" reported by the user to one or more online services, such as social networking services.

Thus, vectors representative of the respective digital content item and user information are generated by server 112 and stored in respective digital content database 120 and user database 122, as depicted respectively at steps 410 and 420 on FIG. 4.

At step 430, for each pair user-item for all users 102 (and/or classes of users 102) and a digital content item that the publisher 142 requests be promoted, two generated vectors are compared, for example by projecting the vectors into a multi dimensional space, and calculating the angle between them: the smaller the angle, the higher a score may be associated at step 440 to the likelihood of a user 102 taking action over the digital content item being promoted by the system 100.

How the procedure 310 is implemented is not particularly limited. For example generation of vectors and their projection into a trained multi dimensional space for comparison purposes may make use of MLAs. The Applicant of the present application has developed corresponding techniques of creation and comparison of vectors representative of item and user information. Such techniques are for example detailed in co-owned PCT Patent Application N° PCT/IB2015/050791, filed Feb. 2, 2015 entitled "METHOD FOR ESTIMATING USER INTERESTS", and in U.S. patent application, filed Oct. 8, 2015 entitled "METHOD OF AND SYSTEM FOR PROCESSING ACTIVITY INDICATIONS ASSOCIATED WITH A USER" and bearing a publication number US20180060412A1. The entirety of these applications and their teaching are incorporated herein by reference in jurisdictions allowing such incorporation by reference.

User Interaction Likelihood Distribution Calculation Procedure

Generally speaking, the user interaction likelihood distribution calculation procedure 320 is executed by the server 112 in order to calculate a distribution of users 102 representative of their scores and hence of their likelihood of taking action over the digital content item being promoted by the system 100.

Figure 5:
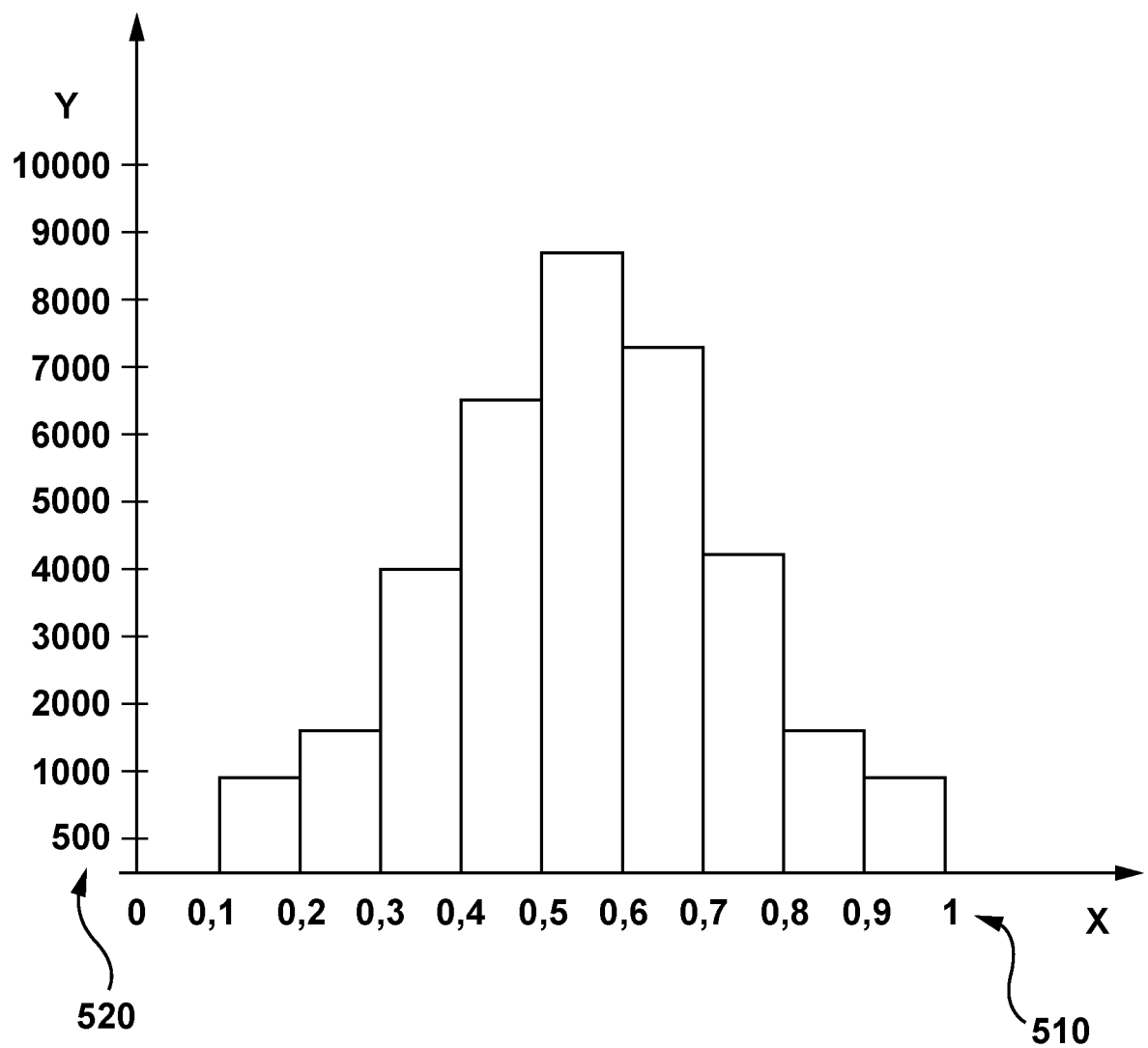
FIG. 5 depicts a user distribution histogram calculated at a server of the system of FIG. 1 in accordance with a non-limiting embodiment of the present technology.

Details of one embodiment for user interaction likelihood distribution calculation procedure 320 are provided hereafter in relation to FIG. 5. The form of such distribution is not particularly limited and may for example take the form of a histogram such as depicted therein. The horizontal X-axis corresponds to score values 510, ranging for example from 0 to 1 with a 0.1 interval. Other value ranges may be implemented such as, without limitation, 0-100. In all cases, one the extreme values in the range (depicted as the lowest value or "0" on FIG. 5) represents the lowest likelihood that a user acts on the promoted digital content item, and the other extreme value in the range (depicted as the highest value or "1" on FIG. 5) represents the highest likelihood that a user acts on the promoted digital content item.

It is contemplated that the range of values on X-axis may be split into a higher granularity of smaller intervals, for example 0.01.

The vertical Y-axis shows the number of users 520 with scores calculated as part of procedure 310 falling into an interval between two consecutive values of the set of values 510.

Number of Users Estimation Procedure

Generally speaking, the number of users estimation procedure 330 is executed by the server 112 in order to estimate the potential number of users within the plurality of users 102 of the system 100 (hereafter: "$E_{users}$" parameter), to which the digital content item to be promoted per a request 160 from the publisher 142, may be recommended during the target period of time $T_{period}$ specified by the publisher 142. In other words, the users estimation procedure 330 is configured to estimate a number of users who can potentially be exposed to the digital content item to be promoted during the target period of time $T_{period}$ specified by the publisher 142.

Figure 8:
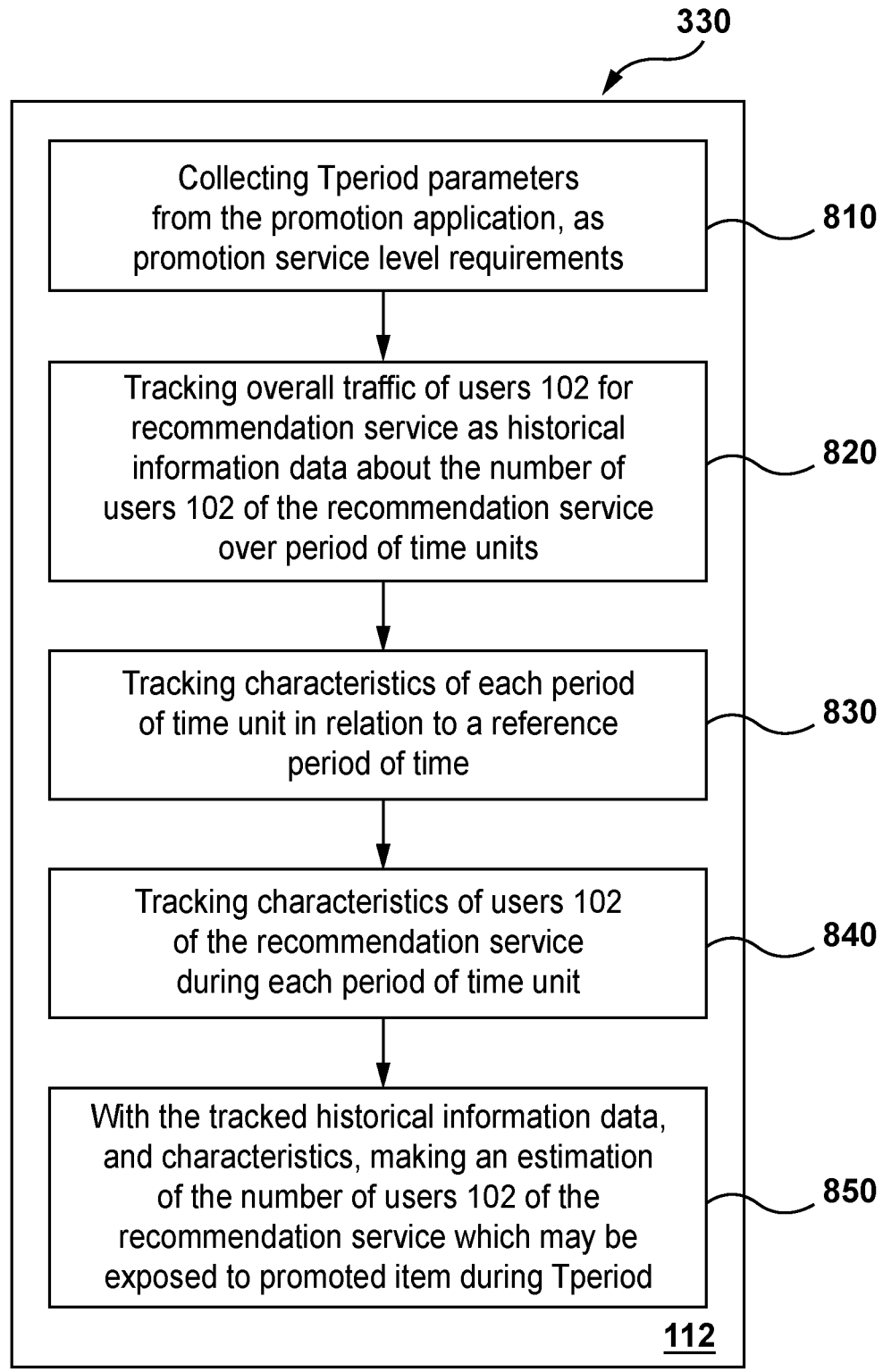
FIG. 8 depicts details of execution of yet another one of computer-implemented procedures of FIG. 3, in accordance with a non-limiting embodiment of the present technology.

Details of one embodiment for number of users estimation procedure 330 are provided hereafter in relation to FIG. 8. It is contemplated that other computer-implemented procedures to those non-exhaustively depicted in FIG. 8 may be implemented by the server 112 for number of users estimation procedure, without departing from the scope of the present technology.

At step 810, the server 112 collects from the promotion application 146 the target period of time $T_{period}$ over which the value of parameter $T_{users}$ should be reached, as specified by the publisher 142 for a required level of promotion service.

At step 820, the server 112 tracks the overall traffic of users 102 of the recommendation service of system 100, and more particularly, the historical information data about the number of users 102 over period of time units. For example, a period of time unit may be one hour, and the recommendation service may have had one hundred thousand users over such period of time unit of one hour.

At step 830, the server 112 tracks the additional information of characteristics of each period of time unit in relation to a reference period of time, such as a day, a week, or a year. For example, whether a time period unit is situated during a weekday, a holiday (which may depend on the geography of users), night time (which may depend on the time zone of users), and the like.

At step 840, the server 112 tracks the additional information of characteristics of users 102 of the recommendation service of system 100 during each period of time unit. For example, which user geographies are more particularly represented in a given period of time unit, or which user languages, or which time zones, and the like.

At step 850, with the tracked information data and characteristics, an estimation $E_{users}$ is made at server 112 of the potential number of users 102 which may be exposed to the promoted digital content item by the recommendation service of system 100, during the period of time $T_{period}$ specified by the publisher 142 for the promotion.

It is contemplated that, in order to execute computer-implemented procedures to infer that estimation, the server 112 may implement one or more MLAs, through the learning afforded by historical and tracked data of numbers of users 102 per time periods.

It is contemplated that other computer-implemented procedures to those non-exhaustively described above may be implemented by the server 112 for estimating the potential number of users 102 which may be exposed to the promoted digital content item by the recommendation service of system 100 during a given time period, without departing from the scope of the present technology.

Threshold Probability Calculation Procedure

Generally speaking, the threshold probability calculation procedure 340 is executed by the server 112 in order to calculate a minimum score (as threshold) in the distribution calculated at user interaction likelihood distribution calculation procedure 320, which indicated a portion of users that need to be exposed to the digital content item to be promoted. More specifically, the portion of users located above the threshold—namely all users 102 with a higher value score (above the threshold). The non-limiting embodiments of the present technology are based on a principle that exposing users 102 above the threshold to the digital content item to be promoted per the request 160 from the publisher 142 will achieve the service level required for the promotion, of the target number $T_{users}$ of users 102 to take an action over the promoted digital content item, during the target period of time $T_{period}$, all as specified by the publisher 142. This is based on a combination of the user score (indicative of the user's potential affinity or interest towards the digital item to be promoted) and the predicted number of users that may fall within each of the scores during the target period of time $T_{period}$.

Figure 6:
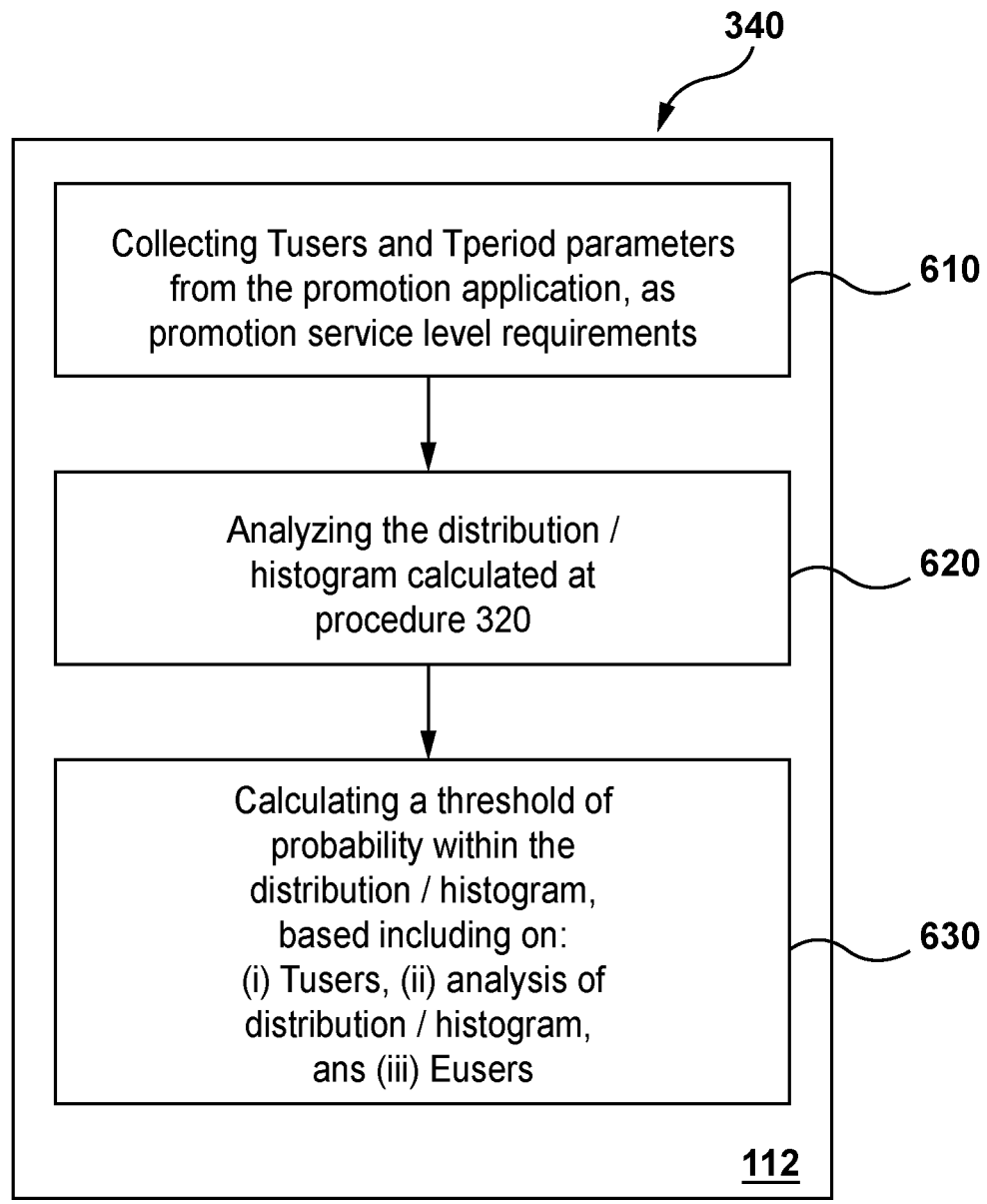
FIG. 6 depicts details of execution of another one of computer-implemented procedures of FIG. 3 in accordance with a non-limiting embodiment of the present technology.

Details of one embodiment for threshold probability calculation procedure 340 are provided hereafter in relation to FIG. 6. It is contemplated that other computer-implemented procedures to those non-exhaustively depicted in FIG. 6 may be implemented by the server 112 for threshold probability calculation procedure, without departing from the scope of the present technology.

At step 610, server 112 collects from the promotion application 146 the target number $T_{users}$ of users 102 to take an action over a promoted digital content item and the target period of time $T_{period}$ over which the value of parameter $T_{users}$ should be reached, as specified by the publisher 142 for a required level of promotion service.

At step 620, server 112 analyzes the distribution and histogram calculated at user interaction likelihood distribution calculation procedure 320.

At step 630, server 112 calculates a minimum score (as threshold) in the distribution and histogram calculated at user interaction likelihood distribution calculation procedure 320, above which all users 102 with a higher value score should be exposed to the digital content item to be promoted, through the recommendation service of system 100, so as to meet the promotion service level requirements by the publisher 142, under the form of specified parameters $T_{users}$ and $T_{period}$.

The calculation at step 630 is based including on (i) parameter $T_{users}$, (ii) analysis of distribution/histogram calculated at procedure 320, and (iii) parameter $E_{users}$. The calculation of step 630 is based on identifying the threshold such as to include the minimum number of users 102 having higher scores (i.e. located towards the right end of the graph as viewed in the orientation of FIG. 5), while ensuring that exposing the digital content item to be promoted to such the number of users 102 will meet the service level required for the promotion, of the target number $T_{users}$ of users 102 to take an action over the promoted digital content item, during the target period of time $T_{period}$, all as specified by the publisher 142.

Figure 7:
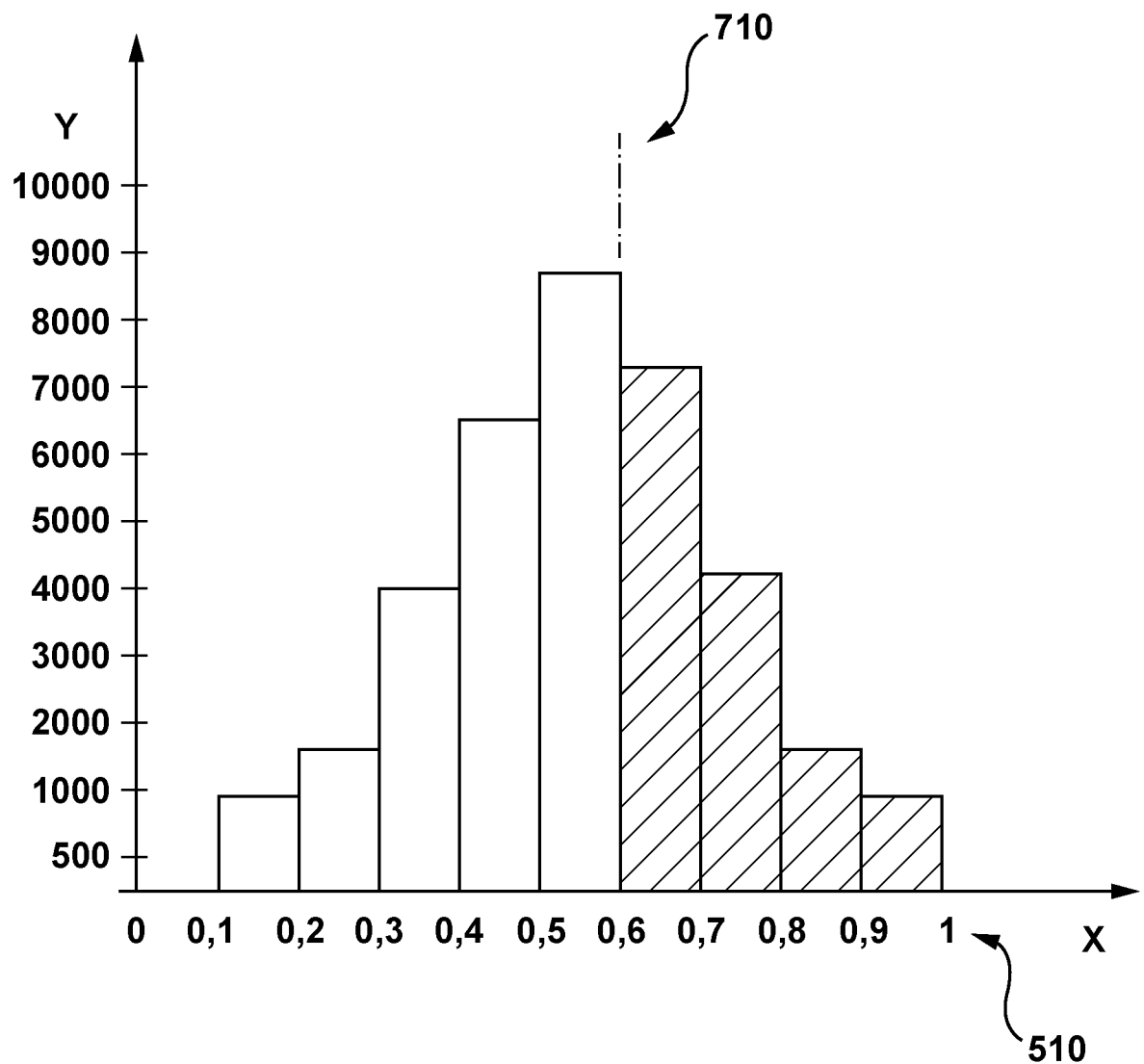
FIG. 7 depicts a calculated minimum score (as threshold) in the distribution histogram of FIG. 5 in accordance with a non-limiting embodiment of the present technology.

FIG. 7 depicts a threshold 710 placed on the histogram of FIG. 5 as calculated by server 112 according to threshold probability calculation procedure 340. It will be apparent that all users to the right of the threshold 710 (whose cumulative number at any given score interval is in shaded area), should be exposed to the digital content item to be promoted, through the recommendation service of system 100.

It is contemplated that other computer-implemented procedures to those non-exhaustively described above may be implemented by the server 112 for calculating a minimum score (as threshold) in the distribution calculated at user interaction likelihood distribution calculation procedure 320, above which all users 102 with a higher value score should be exposed to the digital content item to be promoted, without departing from the scope of the present technology.

Figure 9:
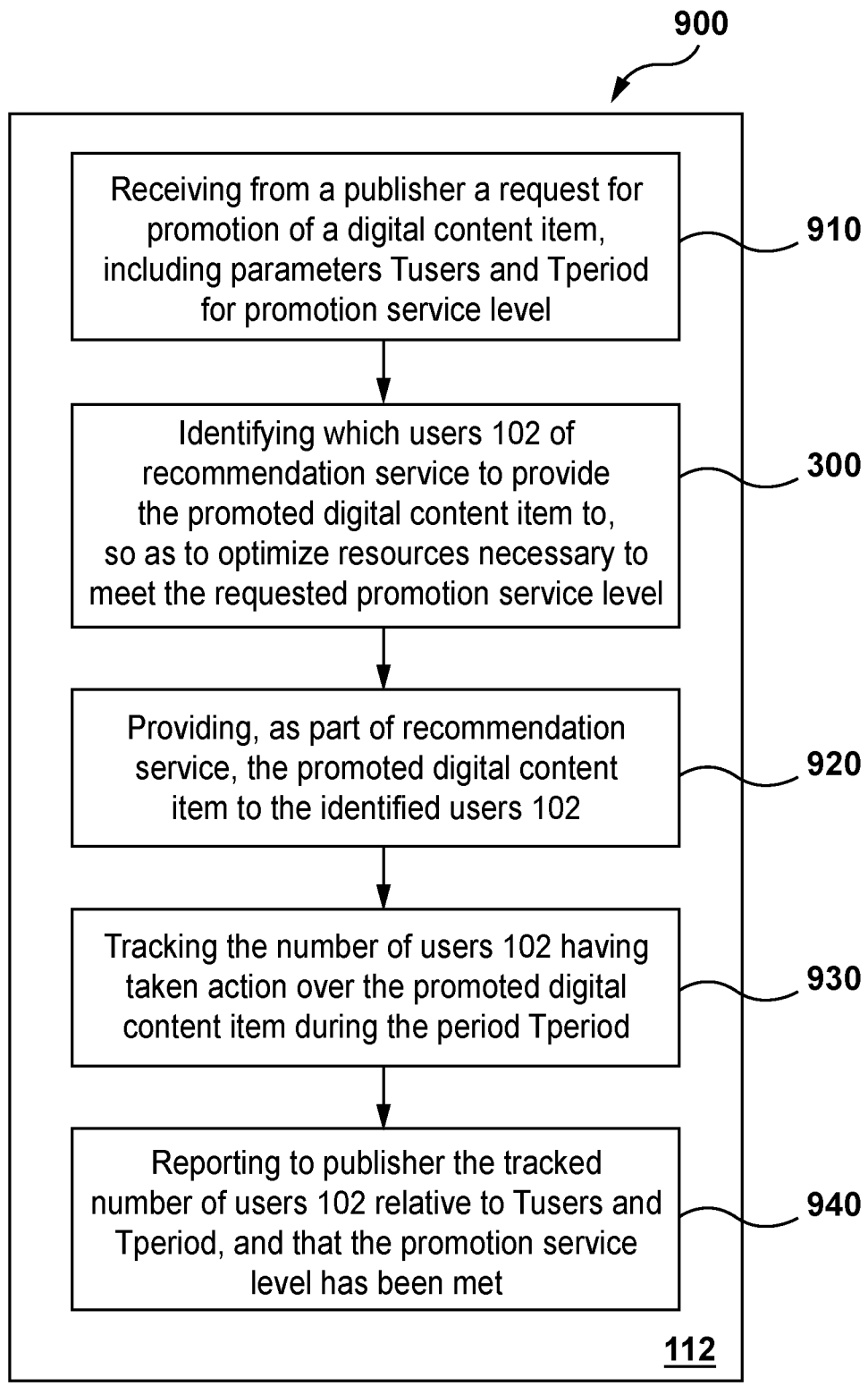
FIG. 9 depicts details of execution of computer-implemented procedures, including procedures of FIG. 3, in accordance with a non-limiting embodiment of the present technology.

It will be apparent that having performed the steps and procedures described above, server 112 may now, as part of the promotion service system 100, and responsive to a request 160 by the publisher 142 to promote a digital content item, including parameters $T_{users}$ and $T_{period}$ representative of the expected promotion service level execute the computer-implemented procedures 900 described in relation to FIG. 9.

It is contemplated that other computer-implemented procedures to those non-exhaustively depicted in FIG. 9 may be implemented by the server 112 for promoting digital content items to users, without departing from the scope of the present technology.

At step 910, the server 112 receives from the publisher 142, using the electronic device 144 and the promotion application 146, the request 160 for digital content promotion. The request includes a specification of the parameters $T_{users}$ and $T_{period}$, characterizing the level of promotion service expected by the publisher 142.

Step 300 may subsequently be executed by the server 112 as described in relation to FIG. 3, to identify which users 102 of the recommendation service to provide the promoted digital content item to, so as to optimize system 100 resources necessary to meet the requested promotion service level.

At step 920, as part of the recommendation service of system 100, the promoted digital content item is provided by the server 112, through the recommended digital content message 152 to be transmitted to the electronic device 104, to users 102 having been identified at step 300—ie: those users 102 having a likelihood of taking an action over the promoted digital content item that is reflected in the calculated distribution/histogram of FIGS. 5 and 7 with a score above the threshold 710.

At step 930, the server 112 tracks actual actions taken by users 102 over the promoted digital content item during the period $T_{period}$.

At step 940, the server 112 reports to the publisher 142, through the digital content promotion message 162 to be transmitted to the electronic device 144, the number of users 102 having taken actual actions, relative to the parameters $T_{users}$ and $T_{period}$, and also reports that the expected promotion service level has been met.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for meeting a service level of content item promotion, the method executable by a server hosting a recommendation service for providing a plurality of digital content items to a user, the user being one of a plurality of users of the service, data representative of the history of interactions of the plurality of users of the service with digital content items and data representative of the digital content items being stored in a storage communicatively coupled to the server, the method comprising:

receiving by the server a request for a promotion of one of the plurality of digital content items with a requested service level, the service level request including indications of:
a target number of users being provided the one digital content item and taking an action over it; and
a target period of time;
calculating by the server a distribution within the plurality of users of the service of the probability of taking an action when being provided the one digital content item, calculating the distribution of probability comprises correlating data representative of the one digital content item, with data representative of the history of interaction with each one of the plurality of users of the service, wherein the correlating comprises:
generating by the server a first vector representative of the one digital content item, and a respective second vector representative of the history of interaction of one of the plurality of users of the recommendation service;
projecting by the server the first and the respective second vector into a multi dimensional space;
calculating by the server an angle between the first vector and the respective second vector; and
repeating by the server the steps of generating the respective second vector, projecting the first vector and the respective second vector, and calculating the angle between the first vector and the respective second vector, for each one of the plurality of users of the recommendation service;
estimating by the server a potential number of users within the plurality of users of the service to which the one digital content item ma.y be provided during the target period of time;
calculating by the server a threshold of probability within the distribution, based including on:
the target number of users in the service level request;
the calculated distribution; and
the estimated potential number of users; and
providing by the server the one digital content item to users within the plurality of users of the service having a probability within the distribution that is above the threshold.

2. The method of claim 1, wherein the generating and projecting are executed using Machine Learning Algorithm (MLA).

3. The method of claim 1, wherein the calculating the distribution of probability is executed by the server for a plurality of classes of users of the service.

4. The method of claim 1, wherein the estimating the potential number of users comprises tracking by the server historical data about the number of users of the recommendation service over a period of time.

5. The method of claim 4, wherein the tracking historical data comprises tracking by the server the geographical location of users of the recommendation service.

6. The method of claim 4, wherein the estimating the potential number of users comprises accounting by the server for a time of day, week or year the target period of time starts.

7. The method of claim 5, wherein the estimating the potential number of users comprises accounting by the server for a time of day, week or year the target period of time starts, relative to the geographical location of users of the recommendation service.

8. The method of claim 1, wherein the estimating the potential number of users is executed by a Machine Learning Algorithm (MLA).

9. The method of claim 1, wherein the request for the promotion of one of the plurality of digital content items with the requested service level is sent by a publisher, and the method further comprises reporting by the server to the publisher that the service level has been met.

10. A server for meeting a service level of content item promotion, the server hosting a recommendation service for providing a plurality of digital content items to a user, the user being one of a plurality of users of the service, data, representative of the history of interactions of the plurality of users of the service with digital content items and data representative of the digital content items being stored in a storage communicatively coupled to the server, the server being configured to:
receive a request for a promotion of one of the plurality of digital content items with a requested service level, the service level request comprising indications of:

a target number of users being provided the one digital content item and taking an action over it; and a target period of time;

calculate a distribution within the plurality of users of the service of the probability of taking an action When being provided the one digital content item, to determine the distribution the server being configured to correlate data representative of the one digital content item, with data, representative of the history of interaction with each one of the plurality of users of the service, wherein to correlate, the server is configured to:

generate a first vector representative of the one digital content item, and a respective second vector representative of the history of interaction of one of the plurality of users of the recommendation service;

project the first and the respective second vector into a multi dimensional space;

calculate an angle between the first and the respective second vector; and repeat the generating the respective second vector, projecting the first vector and the respective second vector, and calculating the angle between the first vector and the respective second vector, for each one of the plurality of users of the recommendation service;

estimate a potential number of users within the plurality of users of the service to which the one digital content item may be provided during the target period of time;

calculate a threshold of probability within the distribution, based including on:

the target number of users in the service level request;

the calculated distribution; and the estimated potential number of users; and provide the one digital content item to users within the plurality of users of the service having a probability within the distribution that is above the threshold.

11. The server of claim 10 further configured so that the generating and projecting are executed using a Machine Learning Algorithm (MLA).

12. The server of claim 10 further configured to calculate a distribution of probability for a plurality of classes of users of the service.

13. The server of claim 10 further configured so that the estimating the potential number of users comprises tracking historical data about the number of users of the recommendation service over a period of time.

14. The server of claim 13 further configured to track the geographical location of users of the recommendation service.

15. The server of claim 13 further configured to account for a time of day, week or year the target period of time starts.

16. The server of claim 14 further configured to account for a time of day, week or year the target period of time starts, relative to the geographical location of users of the recommendation service.

17. The server of claim 10 further configured so that the estimating is executed by a Machine Learning Algorithm (MLA).

18. The server of claim 10 further configured to receive the request for a promotion of one of the plurality of digital content items with a requested service level sent by a publisher, and to report to the publisher that the service level has been met.

* * * * *